United States Patent [19]
Horinouchi et al.

[11] Patent Number: 5,790,502
[45] Date of Patent: Aug. 4, 1998

[54] OPTICAL PICKUP WITH CONVERSION OF DIFFUSION ANGLE OF OUTGOING LIGHT RELATIVE TO DIFFUSION ANGLE OF INCIDENT LIGHT

[75] Inventors: Shogo Horinouchi, Fukuoka; Shigeki Takeuchi, Yamaga; Kazuhiko Higo, Miyazaki; Hideki Yoshinaka, Omuta; Toshihiro Koga, Kurume; Jiro Mimasa, Fukuoka; Hidehiro Kugisaki, Omuta, all of Japan

[73] Assignee: Matsushita Electric Industrial Co., Ltd., Osaka, Japan

[21] Appl. No.: 533,789

[22] Filed: Sep. 26, 1995

[30] Foreign Application Priority Data

Oct. 6, 1994 [JP] Japan ................................ 6-242778
Mar. 27, 1995 [JP] Japan ................................ 7-067756

[51] Int. Cl.⁶ .......................................................... G11B 7/00
[52] U.S. Cl. ......................... 369/112; 369/103; 369/109; 369/110
[58] Field of Search .................................. 369/109, 110, 369/112, 103, 116, 44.14, 44.11, 100, 118, 119

[56] References Cited

U.S. PATENT DOCUMENTS

| | | | |
|---|---|---|---|
| 4,253,723 | 3/1981 | Kojima et al. | 369/103 X |
| 4,730,899 | 3/1988 | Kime et al. | 369/112 X |
| 5,005,162 | 4/1991 | Mitsumori et al. | 369/112 X |
| 5,095,476 | 3/1992 | Greve et al. | 369/110 |

FOREIGN PATENT DOCUMENTS

| | | |
|---|---|---|
| 62-117150 | 5/1987 | Japan . |
| 5-258382A | 10/1993 | Japan . |
| 5-258386A | 10/1993 | Japan . |
| 6-203420A | 7/1994 | Japan . |

*Primary Examiner*—Paul W. Huber
*Attorney, Agent, or Firm*—Watson Cole Stevens Davis, P.L.L.C.

[57] ABSTRACT

In an optical pickup, light, emitted from a light-emitting element, is transmitted through a first beam splitter film with polarization selectivity, and a zero-order diffraction beam and two (±) first order diffraction beams are produced. These beams are applied in a condensed manner to an optical disk through a condensing element, and the return light beam from the optical disk is fed to a photodetector through a second beam splitter film with polarization selectivity, thereby effecting the recording and reproduction of information, the tracking and the focusing. A diffusion angle conversion hologram is provided between the light-emitting element and the first beam splitter film, and with respect to the diffusion angle conversion hologram, the relation between the diffusion angle of the incident beam and the diffusion angle of the outgoing beam is specified. With this arrangement, the light to be incident on the condensing element can have an ideal spherical wave free from a wave aberration, so that an image spot on the optical disk can be condensed into a diffraction limit, and besides by correcting the phase of the beam, a RF signal with a high C/N ratio, a stable focus error signal and a stable track signal are detected.

36 Claims, 32 Drawing Sheets

OPTICAL PICKUP WITH CONVERSION OF DIFFUSION ANGLE OF OUTGOING LIGHT RELATIVE TO DIFFUSION ANGLE OF INCIDENT LIGHT

BACKGROUND OF THE INVENTION

This invention relates to an optical pickup for recording and reproducing information relative to an optical element or an optical disk, and also relates to a method of producing the optical pickup.

It has heretofore been desired to achieve a compact design of an optical disk unit capable of recording and reproducing information using a laser beam, and attempts have been made to achieve a compact and lightweight design of an optical pickup by reducing the number of optical parts. The compact and lightweight design of the optical pickup contributes not only to a reduced overall size of the optical disk unit, but also to an enhanced performance such as a shortened access time. Recently, a hologram optical pickup has been proposed in order to provide a compact and lightweight design, and some of such proposals have been put into practical use.

A conventional hologram optical pickup will now be described with reference to FIGS. 35a to 38. FIG. 35a is a plan view of the conventional optical pickup, and FIG. 35b is a side-elevational view of the conventional optical pickup.

Reference is first made to an outward optical path from a semiconductor laser (light-emitting device) to an optical disk. In FIG. 35b, a laser beam, emitted horizontally from a semiconductor laser chip 2 mounted horizontally on a sensor base plate 1, is caused by a trapezoidal prism 4 (which is mounted on the sensor base plate 1 with its reflecting surface opposed to the semiconductor laser chip 2) to enter the interior of a transparent optical guide member 5 through an incident window 6 on a second surface 5b of the optical guide member 5, so that the laser beam is turned into diffused light 7 in the optical guide member 5. A hologram 8 is formed on a first surface 5a of the optical guide member 5, and the diffused light 7, going out of the optical guide member 5, passes through the hologram 8, and is turned into diffused light 9. The diffused light 9 is incident on an objective lens 10, and is converted into outward convergent light 13 which is then condensed into a spot 12 on an information recording layer 11a of the optical disk 11.

Next, reference is made to a return optical path from the optical disk to light-receiving sensors. Reflected light 14 from the information recording layer 11 of the optical disk passes through the objective lens 10, and is converted into return convergent light 15, and then is incident on the hologram 8.

As shown in FIG. 36, the hologram 8 is divided into two regions having an equal area by a division line (boundary) extending in the same direction as that of a track of the optical disk 11, the two regions having different patterns, respectively. The hologram 8 converts the return convergent light 15 into first diffraction light 16 and second diffraction light 17 diffracting in different directions at an angle of $(2n+1)\pi/4$, such as 45° and 135°, relative to the polarization direction of the semiconductor laser chip 2.

A first return polarized light splitting portion 18 and a second return polarized light splitting portion 19 are formed on the second surface 5b of the optical guide member 5, and each of the two splitting portions 18 and 19 is formed of a return polarization separation film coated on the second surface 5b, and transmits a P polarization component of the diffraction light 16, 17 therethrough, but reflects an S polarization component thereof.

If the condition of polarization of the diffused light 7 incident on the hologram 8 is represented by linearly-polarized light 23 as indicated by an arrow in FIG. 35a, the P polarization component and S polarization component of each of the two diffraction light beams 16 and 17 become about a half relative to a respective one of the two return polarized light splitting portions 18 and 19, since the direction of diffraction of the two diffraction light beams 16 and 17 is set to $(2n+1)\pi/4$ relative to the polarization direction of the linearly-polarized light 23. Therefore, the light amount of each of first and second transmitted light beams 24 and 25, emerging respectively from the two return polarized light splitting portions 18 and 19, is about a half of the light amount of a respective one of the first and second diffraction light beams 16 and 17. The two transmitted light beams 24 and 25 are applied respectively to first and second light-receiving sensors 26 and 27 formed on the sensor base plate 1. First and second reflected light beams 28 and 29 (which are the remainder or the other halves of the two diffraction light beams 16 and 17, respectively), reflected respectively by the two return polarized light splitting portions 18 and 19, are further reflected respectively by first and second reflecting portions 30 and 31 on the first surface 5a to respectively form third and fourth reflected light beams 32 and 33 directed toward the second surface 5b. The third and fourth reflected light beams 32 and 33 pass respectively through first and second transmission windows 34 and 35 on the second surface 5b to form third and fourth transmitted light beams 36 and 37, respectively, which are applied to third and fourth light-receiving sensors 38 and 39, respectively. The focus of the diffraction light 16 is located between the return polarized light splitting portion 18 and the third light-receiving sensor 38 while the focus of the diffraction light 17 is located between the return polarized light splitting portion 19 and the fourth light-receiving sensor 39.

Next, an opto-magnetic signal detection principle will now be described in detail. In FIG. 37, reference numeral 23 denotes the direction of polarization of the linearly-polarized light 23 incident on the hologram 8 as described above. The hologram 8 does not exert any influence on the polarization plane, and therefore if any information is not stored on the information recording surface 11a of the optical disk 11 (that is, the information recording surface 11a is not magnetized), the two diffraction light beams 16 and 17, which are the reflected light of the spot 12, have the same polarization direction as that of the linearly-polarized light 23. With respect to the polarization direction of the two diffraction light beams 16 and 17 in this condition, the directions of diffraction of the two diffraction light beams 16 and 17 are set respectively to 45° and 135° with respect to the polarization direction of the linearly-polarized light 23 so that the diffraction light beams 16 and 17 can be incident respectively on the two return polarized light splitting portions 18 and 19 (which transmit substantially 100% of the P polarization component therethrough, and reflect substantially 100% of the S polarization component) with respective bearings of 45° and 135° as shown in FIG. 37. The direction of rotation of the linearly-polarized light 23, when reflected by a magnetized information pit in the optical disk 11, varies in the range of $\pm\theta k$ depending on the polarity and magnitude of the magnetization (Kerr effect).

Here, let's assume that linearly-polarized light 40 is obtained by rotating the linearly-polarized light 23 by an angle of $\theta k$, and that linearly-polarized light 41 is obtained by rotating the linearly-polarized light 23 by an angle $-\theta k$. Here, let's consider the case where the optical signal, modulated from the linearly-polarized light 40 to the linearly-polarized light 41 by the recording magnetic field of the optical disk 11, is incident on the polarized light splitting films of the two polarized light splitting portions 18 and 19.

When the polarization condition of the return convergent light 15 is rotated θk from the condition of the linearly-polarized light 23, the polarization condition of the first diffraction light 16 is modulated into the linearly- polarized light 40 while the polarization condition of the second diffraction light 17 is modulated into the linearly-polarized light 41. When the polarization condition of the return convergent light 15 is rotated −θk from the condition of the linearly-polarized light 23, the polarization condition of the first diffraction light 16 is modulated into the linearly-polarized light 41 while the polarization condition of the second diffraction light 17 is modulated into the linearly-polarized light 40. Therefore, the P polarization component of the second diffraction light 17 is equal to the S polarization component of the first diffraction light 16, and the S polarization component of the second diffraction light 17 is equal to the P polarization component of the first diffraction light 16. An RF reproducing signal is doubled in its signal component because of the differential (expressed by formula (1) described later) between the sum of the signal of the P polarization component of the first diffraction light 16 and the signal of the S polarization component of the second diffraction light 17 and the sum of the signal of the S polarization component of the first diffraction light 16 and the signal of the P polarization component of the second diffraction light 17, and noises in the components of the same phase are canceled, so that the signal with a high C/N ratio can be obtained.

Signals are inputted to and outputted from the sensor base plate 1, having the semiconductor laser chip 2 and the group of light-receiving sensors, through a lead frame 44.

Next, the configuration of the first, second, third and fourth light-receiving sensors 26, 27, 38 and 39, as well as a signal detection principle, will be described with reference to FIG. 38.

The second light-receiving sensor 27 and the fourth light-receiving sensor 39 are a three-division type, that is, the former is divided into three sections 27a, 27b and 27c while the latter is divided into three sections 39a, 39b and 39c. Here, outputs of the first and third light-receiving sensors 26 and 38 are represented by I26 and I38, respectively, outputs of the three sections 27a, 27b and 27c of the second light-receiving sensor 27 are represented by I27a, I27b and I27c, respectively, and outputs of the three sections 39a, 39b and 39c of the fourth light-receiving sensor 39 are represented by I39a, I39b and I39c, respectively.

The RF reproduction signal (R.F.) among the various signals will first be described. As described above, the RF reproduction signal is obtained by the differential between the sum signal representative of the sum of the P polarization component of the diffraction light 16 and the S polarization component of the diffraction light 17 and the sum signal representative of the sum of the S polarization component of the diffraction light 16 and the P polarization component of the diffraction light 17, and therefore R.F. is obtained from the following formula as will be appreciated from a circuit diagram of FIG. 38:

$$R.F.=[I26-(I27a+I27b+I27c)]-[I38-(I39a+I39b+I39c)]$$

Next, a focus error signal (F.E.) will be described. F.E. is obtained from the following formula as will be appreciated from the circuit diagram of FIG. 38:

$$F.E.=[(I27a+I27c)+I39b]-[(I39a+I39c)+I27b]$$

Here, let's assume that the spot 12 formed by the objective lens 10 is accurately in focus on the information recording layer 11a of the optical disk 11, and that in this focused condition, the configuration of irradiation of the laser beam on the second light-receiving sensor 27 is represented by 45a while the configuration of irradiation of the laser beam on the fourth light-receiving sensor 39 is represented by 46a. Then, the laser beam-irradiating intensity distribution and the positions of the light-receiving sensors are so adjusted that the following formula can be established:

$$F.E.=0$$

Next, when the distance between the optical disk 11 and the objective lens 10 decreased from that in the above-mentioned focal distance condition, the configuration of irradiation of the laser beam on the second light-receiving sensor 27 is represented by 45c while the configuration of irradiation of the laser beam on the fourth light-receiving sensor 39 is represented by 46c, and F.E. is varied as indicated in the following formula:

$$F.E.>0$$

In contrast, when the distance between the optical disk 11 and the objective lens 10 increases from the above-mentioned focal distance condition, the configuration of irradiation of the laser beam on the second light-receiving sensor 27 is represented by 45b while the configuration of irradiation of the laser beam on the fourth light-receiving sensor 39 is represented by 46b, and F.E. is varied as indicated in the following formula:

$$F.E.<0$$

This focus error detection method is known as a spot-size method.

Next, a tracking error signal (T.E.) will be described. The boundary between the two regions of the hologram 8, having the same area and the different patterns, is extended in the same direction as that of the track of the optical disk, and therefore track information, contained in the reflected light from the optical disk 11, is divided by the hologram 8 into two (right and left) track informations divided by the centerline of the spot 12 extending in the direction of the track. The two track informations are divided into the first and second diffraction light beams 16 and 17. The hologram 8 is so designed that the two regions for the first and second diffraction light beams 16 and 17 have the same diffraction efficiency. Therefore, T.E. is obtained from the following formula as will be appreciated from the circuit diagram of FIG. 38:

$$T.E.=[(I27a+I27b+I27c)+(I39a+I39b+I39c)]-(I26+I38)$$

When the spot 12 is applied to the centerline of the track, the two regions of the hologram 8 receive the return convergent light 15 in an equal amount, and therefore the two diffraction light beams 16 and 17 are equal in light amount to each other, and the sum signal representative of the sum of the signal of the first light-receiving sensor 26 and the signal of the third light-receiving sensor 38 (which are representative of the light amount of the first diffraction light 16) is equal to the sum signal representative of the sum of the signal of the second light-receiving sensor 27 and the signal of the fourth light-receiving sensor 39 (which are representative of the light amount of the second diffraction light 17). Therefore, T.E. is expressed by the following formula:

$$T.E.=0$$

When the spot 12 is displaced from the centerline of the track in a direction at 90° with respect to the track, the two regions of the hologram 8 receive the return convergent light 15 in different amounts, respectively, and the sum signal representative of the sum of the signal of the first light-receiving sensor 26 and the signal of the third light-receiving sensor 38 (which are representative of the light amount of the first diffraction light 16) is not equal to the sum signal representative of the sum of the signal of the second light-receiving sensor 27 and the signal of the fourth light-receiving sensor 39 (which are representative of the light amount of the second diffraction light 17). Therefore, T.E. is expressed by either of the following formulas:

$$T.E.>0$$

$$T.E.<0$$

This tracking error detection method is known as a push-pull method.

Thus, the hologram 8 is divided into the two regions of the same area (which have the respective different patterns) by the division line (boundary) extending in the same direction as that of the track of the optical disk 11, and the two regions for the two diffraction light beams 16 and 17 have the same diffraction efficiency. With this design, the tracking error signal can be obtained.

In the manufacture of an optical pickup as disclosed in Japanese Patent Unexamined Publication Nos. 5-258382 and 5-258386, optical guide elements having optical elements provided at boundary surfaces, are laminated or bonded together to form an assembly block and then inclined surfaces are formed. Thereafter, polarization films are formed, and then the assembly block is cut into a predetermined size to thereby provide an optical pickup element.

In the above conventional construction, however, the following problems are encountered, so that the C/N ratio of the RF signal is adversely affected:

Although a hologram is used for separating outward light and return light from each other, zero-order diffraction light is used in the outward path while first order light is used in the return path, and because of a limited angle of incidence on a polarized light splitting portion, the blazing pitch of the hologram is small, and the suppression of the first order diffraction light by blazing is difficult, and besides the first order diffraction efficiency of the S polarization component is lower than the first order diffraction efficiency of the P polarization component. Therefore, the improvement of the efficiency of use of the outward and return light beams (the zero-order diffraction efficiency of the outward light x the first order diffraction efficiency of the return light) is limited, and a loss of the light amount at the hologram is large.

Since the RF signal is also detected by light-receiving sensors of the divided type which detects a focus error, a loss of the light amount occurs at a dead zone of the division portion.

Since a beam splitter film having polarization selectivity is not used, an enhancing effect for increasing the apparent Kerr rotation angle is not obtained.

In addition, the following problems are encountered, so that the focus error signal and the tracking error signal are adversely affected:

The focus error signal is detected by the size of a P polarized-light spot on the light-receiving sensor and the size of a S polarized-light spot on the light-receiving sensor, and therefore when the light amount ratio of the P polarized-light to the S polarized-light of the diffraction light is varied by birefringence, the Kerr rotation and so on, the focus error signal is subjected to offset.

Since the tracking error signal is detected by a push-pull method, this detection is likely to be affected by the depth of pits and grooves in the optical disk.

In the case where the tracking error signal is detected by a 3-beam method using a diffraction grating, crosstalk between a main beam and side beams occurs since the size of the spot on the light-receiving sensor is large.

In the manufacture of the optical pickup as disclosed in Japanese Patent Unexamined Publication Nos. 5-258382 and 5-258386, the number of the optical pickup elements produced from one assembly block is determined by the length of the optical guide members, and besides since the assembly block has the inclined surfaces, it is difficult to arrange the pickup elements of the same configuration in the direction of the width of the assembly block, which results in a low productivity.

U.S. Pat. No. 5,095,476 and Japanese Patent Unexamined Publication No. 62-117150 are other prior art publications.

SUMMARY OF THE INVENTION

It is an object of this invention to provide an optical pickup which is capable of producing a reproduction signal of good quality with a high C/N ratio and stable servo signals, and is compact in size, and can be manufactured at low costs with a high productivity.

DESCRIPTION OF THE PREFERRED EMBODIMENTS

A first embodiment of the present invention will now be described with reference to the drawings.

Figure 1:
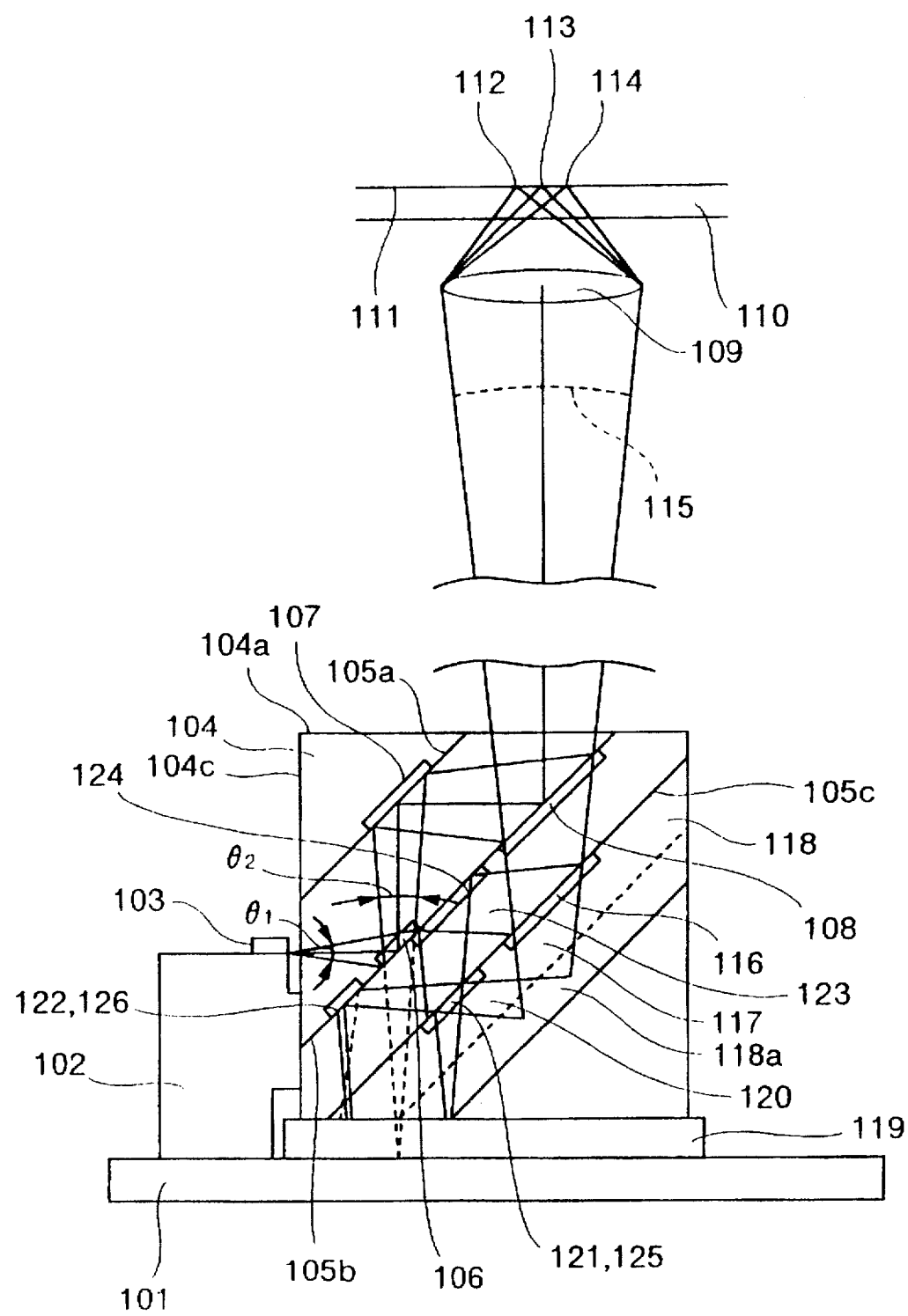
FIG. 1 is a side-elevational view of a first embodiment of an optical pickup of the invention.
Figure 2:
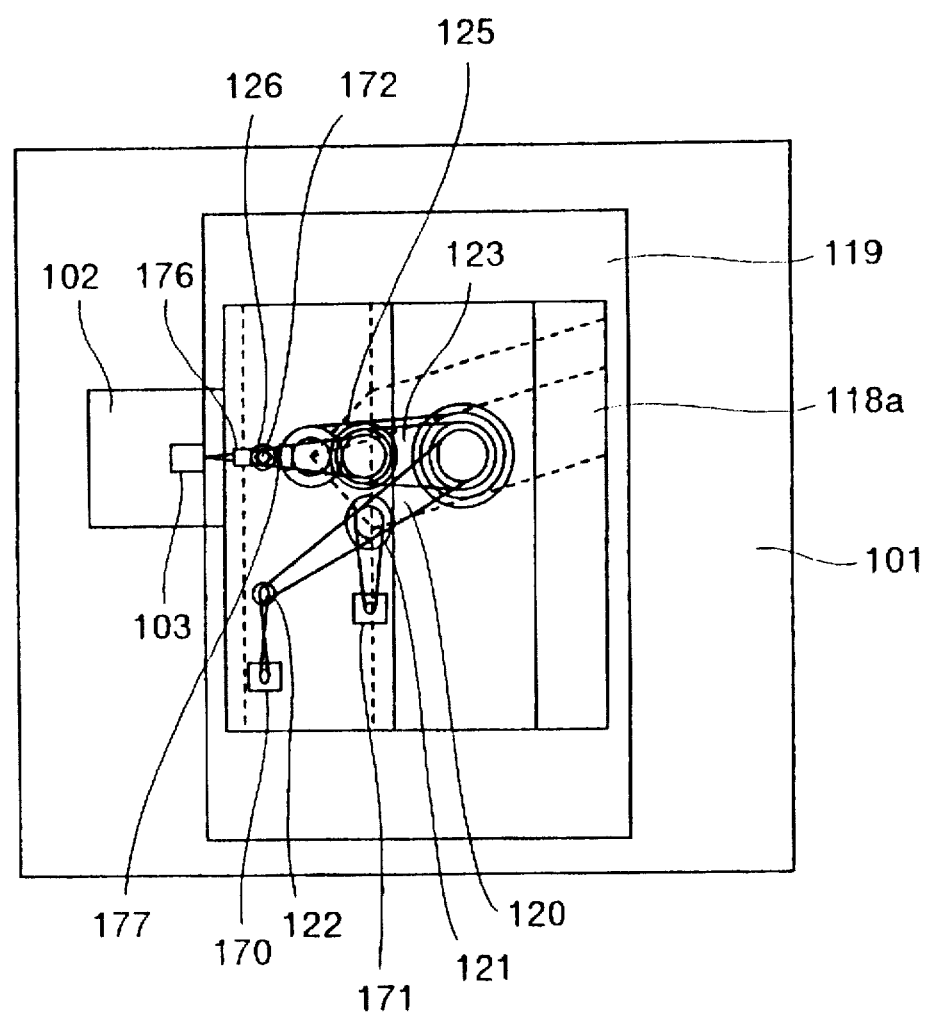
FIG. 2 is a plan view of the optical pickup of the first embodiment.

FIG. 1 is a side-elevational view of the first embodiment of an optical pickup of the invention, and FIG. 2 is a plan view of this optical pickup.

In FIGS. 1 and 2, a laser beam, emitted horizontally from a semiconductor laser chip 103 mounted horizontally on a base plate 101 through a submount 102, is incident on a surface 104c of an optical guide member 104 having a plurality of parallel inclined surfaces, and enters the optical guide member 104, and reaches a diffusion angle conversion hologram 106 of the reflective type formed on a second inclined surface 105b of the optical guide member 104. This hologram 106 has such a function that it converts a diffusion angle of the outgoing light with respect to a diffusion angle of the incident light (hereinafter referred to as "to convert the diffusion angle"). The light, converted in diffusion angle and reflected by the diffusion angle conversion hologram 106, is divided into zero-order diffraction light (hereinafter referred to as "main beam") and ±first order diffraction light (hereinafter referred to as "side beam") by a diffraction grating 107 of the reflective type formed on a first inclined surface 105a. The main beam and the side beams, formed by the diffraction grating 107, are incident on a first beam splitter film (first beam splitter film having polarization selectivity) 108. That portion of the light (which is incident on the first beam splitter film 108) transmitting through this film 108 is used as monitor light for the light emitted from the semiconductor laser chip 103. The main beam and the side beams reflected by the first beam splitter film 108 transmit through a surface 104a of the optical guide member 104, and are passed through an objective lens 109 to form images on an information recording surface 111 of an optical disk 110 by the condensing effect of the objective lens 109. At this time, the image spots 112 and 114 of the two side beams are located substantially symmetrically with each other about the image spot of the main beam. The recording of information on the information recording surface 111, and the reading of a reproduction signal and tracking and focusing signals (that is, servo signals) from the information recording surface 111, are effected using the image spot 113 of the main beam and the image spots 112 and 114 of the side beams.

The diffusion angle conversion hologram 106 can freely convert the diffusion angle of the reflected light from the diffusion angle conversion hologram 106 with respect to the diffusion angle of the light beam (which is emitted from the semiconductor laser chip 103) that can be incident on the diffusion angle conversion hologram 106. The diffusion angle conversion hologram 106 can also convert the light into parallel rays of light having no diffusion angle at all. Thanks to the diffusion angle conversion hologram 106, the light beam, going out of the optical guide member 104, is formed into an ideal spherical wave 115 free from wave aberrations accumulated in the path, as shown in FIG. 1.

Therefore, the light incident on the objective lens 109 has the ideal spherical wave 115, and the image spot, formed on the optical disk 110 by the objective lens 109, is condensed or converged substantially into a diffraction limit, that is, an ideal size, so that the information can be easily recorded and reproduced.

The return light, that is, the main beam and the side beams reflected by the information recording surface 111 of the optical disk 110, again passes through the objective lens 109 and the surface 104a of the optical guide member 104, and are again incident on the first beam splitter film 108 formed on the second inclined surface 105b of the optical guide member 104. The first beam splitter film 108 has a predetermined reflectance for light (hereinafter referred to merely as "S polarization component) having a oscillation component perpendicular to the plane of incidence, and has substantially 100% transmittance for a oscillation component (hereinafter referred to merely as "P polarization component) parallel to the plane of incidence.

That portion of the return light (from the optical disk 110) transmitted through the first beam splitter film 108 is incident on a second beam splitter film (second beam splitter film having polarization selectivity) 116 formed on a third inclined surface 105c of the optical guide member 104 parallel to the first inclined surface 105a. The second beam splitter film 116, like the first beam splitter film 108, has a predetermined reflectance for light (hereinafter referred to merely as "S polarization component") having a oscillation component perpendicular to the plane of incidence, and has substantially 100% transmittance for a oscillation component (hereinafter referred to merely as "P polarization component") parallel to the plane of incidence.

Figure 3:
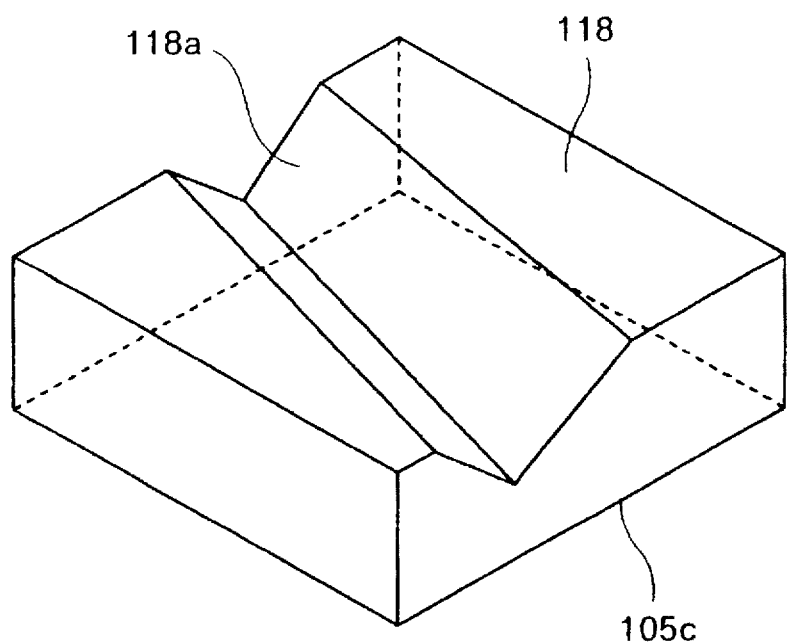
FIG. 3 is a perspective view of a V-shaped groove plate in the optical pickup of the first embodiment.

Reference is now made to that portion (that is, transmitted light 117) of the light beam (incident on the second beam splitter film 116) transmitted through the second beam splitter film 116. The transmitted light 117 is incident on a V-shaped groove plate 118 formed on the third inclined surface 105c. FIG. 3 is a perspective view of the V-shaped groove plate 118 of the optical pickup of the first embodiment. A V-shaped groove is formed in the V-shaped groove plate 118 by molding or cutting, and the V-shaped groove plate 118 is formed on the third inclined surface 105c. The transmitted light 116 from the second beam splitter film 116 is reflected by a reflecting surface 118a defined by a reflecting film formed on the surface of the V-shaped groove in the V-shaped groove plate 118.

Figure 4:
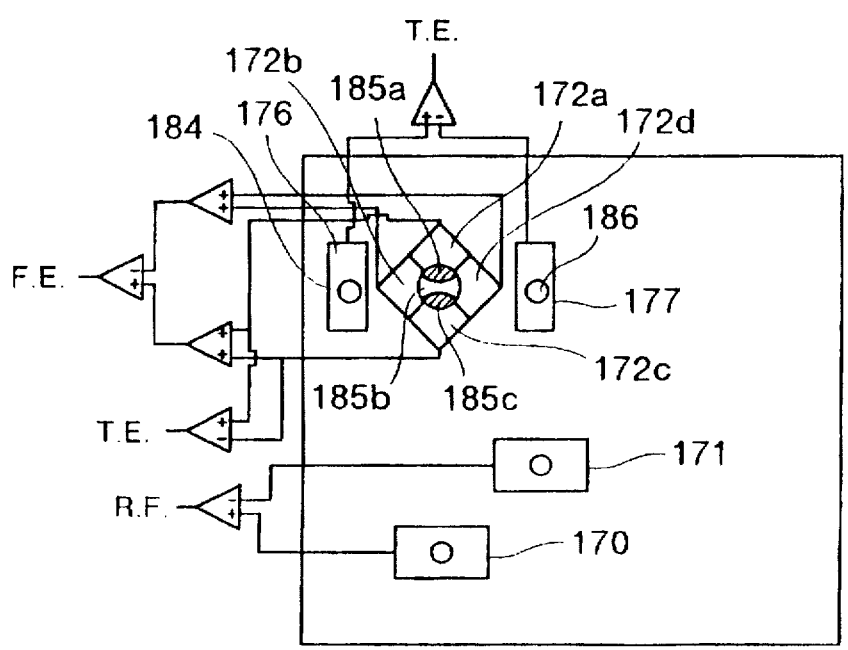
FIG. 4 is a view showing the arrangement of light-receiving sensors and a signal processing circuit in the optical pickup of the first embodiment.

FIG. 4 shows the arrangement of light-receiving sensors on a sensor base plate 119. Reflected light 120 from the surface 118a of the V-shaped groove plate 118 is incident on a polarized light splitting film 121 formed on the third inclined surface 105c. The P polarization component of the reflected light 120 transmits substantially 100% through the polarized light splitting film 121, and is reflected by a reflecting film 122 formed on the second inclined surface 105b of the optical guide member, and reaches a light-receiving sensor 170 on the sensor base plate 119. On the other hand, the S polarization component of the reflected light 120 from the surface 118a of the V-shaped groove plate 118 is reflected substantially 100% by the polarized light splitting film 121, and reaches a light-receiving sensor 171 on the sensor base plate 119.

Figure 5:
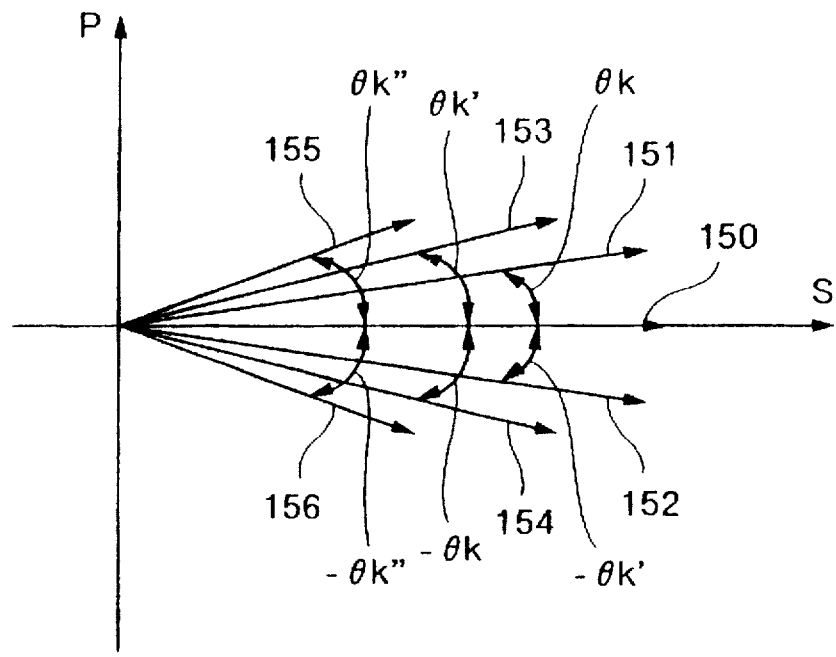
FIG. 5 is an illustration showing an opto-magnetic signal detection principle in the optical pickup of the first embodiment.
Figure 6:
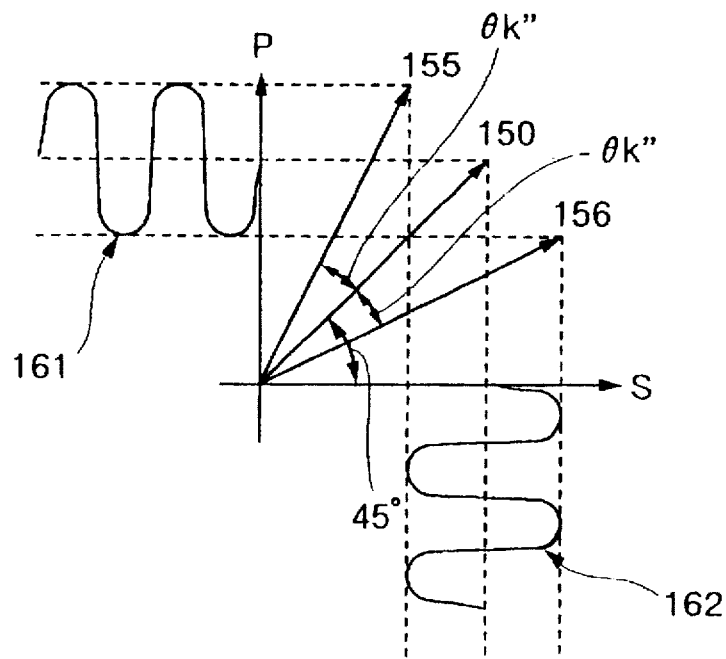
FIG. 6 is an illustration showing a condition of polarization in a polarized light splitting film in the first embodiment.

An opto-magnetic signal detection principle will now be described in detail with reference to FIGS. 4 to 6, there is provided an enhancing construction for apparently amplifying the Kerr rotation angle θk so as to obtain the RF reproduction signal of good quality and also to increase the C/N ratio. In FIG. 5, arrow 150 indicates the direction of polarization of linearly polarized light incident on the polarized light splitting film 121 if any information is not recorded on the information recording surface 111 of the optical disk 110, as described above. When the linearly polarized light 150 is reflected by magnetized information pits of the optical disk 110, the rotation angle varies in the range of ±θk depending on the polarity and magnitude of the magnetization (Kerr effect). θk is called the Kerr rotation angle. Here, linearly polarized light 151 is obtained by rotating the linearly polarized light 150 by an angle θk, and linearly polarized light 152 is obtained by rotating the linearly polarized light 150 by an angle −θk. The return light from the optical disk 110 transmits through the upper surface 104a of the optical guide member 104, and then is incident on the first beam splitter film 108 formed on the second inclined surface 105b. The first beam splitter film 108 has the predetermined reflectance for the S polarized-light, and also has substantially 100% transmittance for the P polarized-light. Therefore, with respect to the linear polarization direction in FIG. 5, the linearly polarized light 151, rotated by θk, is brought into a θk' rotated-condition as at 153, and the linearly polarized light 152, rotated by −θk, is brought into a −θk' rotated-condition as at 154, so that the Kerr rotation angle θk is apparently increased. The same occurs with the light 117 transmitted through the second beam splitter film 116, and with respect to the linear polarization direction, the linearly polarized light 153, rotated by θk', is brought into a θk" rotated-condition as at 155, and the linearly polarized light 154, rotated by −θk', is brought into a −θk" rotated-condition as at 156, so that the Kerr rotation angle θk is further apparently increased. This construction for thus increasing the apparent Kerr rotation angle θk is generally called the enhancing construction.

Therefore, with respect to the reflected light 120 reflected from the reflecting surface 118a of the V-shaped groove plate 118 to be incident on the polarized light splitting film 121, the apparent Kerr rotation angle θk has already been increased from θk to θk". FIG. 6 is a diagram explanatory of the condition of polarization in the polarized light splitting film 121 of the first embodiment. The surface 118a of the V-shaped groove plate 118 is arranged at such an angle that the P polarization component (the component parallel to the plane of incidence) and S polarization component (the component perpendicular to the plane of incidence) of the reflected light 120 with respect to the plane of incidence on the polarized light splitting film 121 formed on the third inclined surface 105c are substantially fifty-fifty.

Here, the condition in which the linearly polarized light 150 is rotated by θk" is represented by the linearly polarized light 155, and the condition in which the linearly polarized light 150 is rotated by −θk" is represented by the linearly polarized light 156. When the opto-magnetic signal, modulated from the linearly polarized light 155 to the linearly polarized light 156, is incident on the polarized light splitting film 121, the signal of the P polarization component received by the light-receiving sensor 170 is represented by a signal 161, and the signal of the S polarization component received by the light-receiving sensor 171 is represented by a signal 162. Therefore, the RF reproduction signal is doubled in signal component by obtaining the differential between the signal 161 of the P polarization component of the reflected light and the signal 162 of the S polarization component thereof, that is, the differential between the signal of the light-receiving sensor 170 and the signal of the light-receiving sensor 171, and also noises in the components of the same phase are canceled, so that the high C/N ratio can be obtained.

If the photoelectric current detected by the first light-receiving sensor 170 is represented by I170, and the photoelectric current detected by the second light-receiving sensor 171 is represented by I171, then the RF signal (R.F.) is expressed by the following formula:

$$R.F.=I170-I171$$

Next, reference is made of reflected light 123 among the light beam incident on the second beam splitter film 116. The reflected light 123 is incident on an astigmatism-generating hologram 124 of the reflective-type formed on the second inclined surface 105b. The reflected light 123 is reflected by the astigmatism-generating hologram 124 while generating astigmatism, and is reflected by a reflecting film 125 on the third inclined surface 105c, and by a reflecting film 126 on the second inclined surface 105b, and then the return light of the main beam reaches a light-receiving sensor 172 on the sensor base plate 119 while the return light beams of the side beams reach light-receiving sensors 176 and 177 on the sensor base plate 119, respectively.

The detection of the focus error signal by an astigmatism method, as well as the condition of the astigmatism in this embodiment, will now be described in further detail with reference to FIG. 4 and FIGS. 7a to 7f.

Figure 7A:
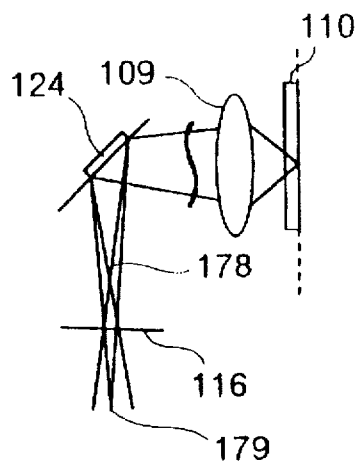
FIGS. 7a to 7f are views showing a focus error signal detection principle by an astigmatism method according to the invention.
Figure 7D:
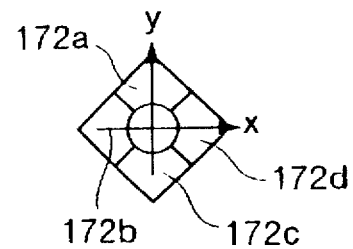
Figure 7B:
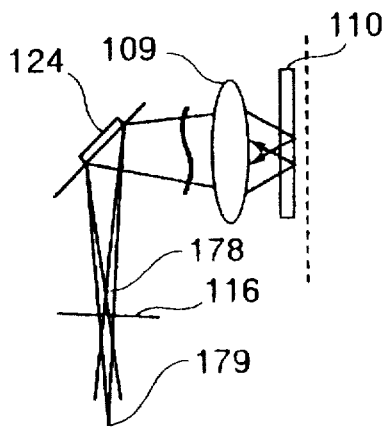
Figure 7E:
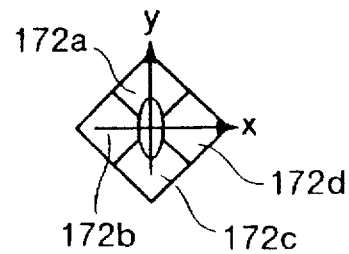
Figure 7C:
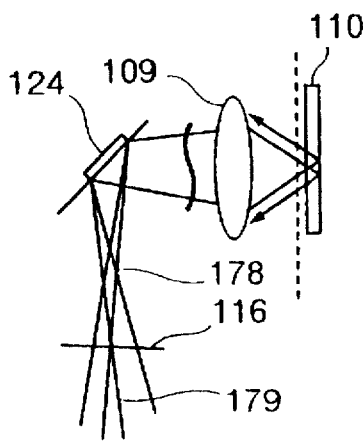
Figure 7F:
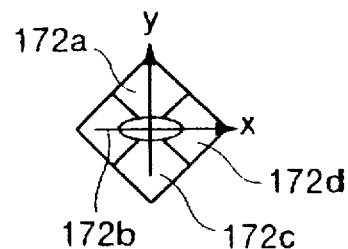

FIGS. 7a to 7c show the astigmatic light beam, and more specifically these Figures show a condition in which the optical disk 110 is at the focal position, a condition in which the optical disk 110 is off the focal position inward, and a condition in which the optical disk 110 is off the focal position onward, respectively. FIGS. 7d to 7f show the configuration of the light spot, formed by the astigmatism-generating hologram 124 on light-receiving sensors 172a, 172b, 172c and 172d, the spot configurations of FIGS. 7d to 7f corresponding to the conditions of FIGS. 7a to 7c, respectively.

When the optical disk 110 is disposed in the focal position, the astigmatism-generating hologram 124 produces a first focus 178 upstream of the light-receiving sensor 172, and produces a second focus 179 downstream side of the light-receiving sensor 172. If expressed in terms of an x-axis direction and a y-axis direction as shown in FIGS. 7d to 7f, a linear image in the y-axis direction is formed at the position of the first focus 178, and a linear image is formed on the x-axis at the position of the second focus 179. The astigmatism-generating hologram 124 is so designed that when the optical disk 110 is disposed in the focal position, the diameters of the spot (produced by the astigmatism) in the x-axis and y-axis directions are equal to each other, so that the spot has a circular shape.

If the photoelectric currents, outputted respectively from the light-receiving sensors 172a, 172b, 172c and 172d, are represented respectively by I172a, I172b, I172c and I172d, then the focus error signal is expressed by the following formula as will be appreciated from the circuit diagram of FIG. 4:

$$F.E.=(I172a+I172c)-(I172b+I172d)$$

When the optical disk 110 is disposed in the focal position, the diameters of the spot in the x-axis and y-axis directions are equal to each other, so that the spot has a circular shape as can be seen from FIGS. 7a to 7d, and therefore the sum of the amounts of the light received respectively by the sensors 172a and 172c is equal to the sum of the amounts of the light received respectively by the sensors 172b and 172d, so that the focus error signal is expressed by the following formula:

$$F.E.=0$$

When the optical disk 110 is off the focal position inward, the first focus 178 and the second focus 179, which are produced by the astigmatism-generating hologram 124, are farther from the focus error detection element 124, so that the spot on the light-receiving sensors 172a, 172b, 172c and 172d is formed into an oval light beam having a major axis in the y-axis direction as shown in FIG. 7e. As a result, the amount of the light received by the light-receiving sensors 172a and 172c is larger than the amount of the light received by the light-receiving sensors 172b and 172d, and the focus error signal is expressed by the following formula:

$$F.E.>0$$

When the optical disk 110 is off the focal position outward, the first focus 178 and the second focus 179, which are produced by the astigmatism-generating hologram 124, are closer to the astigmatism-generating hologram 124, so that the spot on the light-receiving sensors 172a, 172b, 172c and 172d is formed into an oval light beam having a major axis in the x-axis direction as shown in FIG. 7f. As a result, the amount of the light received by the light-receiving sensors 172b and 172d is larger than the amount of the light received by the light-receiving sensors 172a and 172c, and the focus error signal is expressed by the following formula:

$$F.E.<0$$

The above focus error signal detection method is known as an astigmatism method.

The tracking detection method will now be described with reference to FIG. 4 and FIGS. 8a to 8c.

Figure 8A:
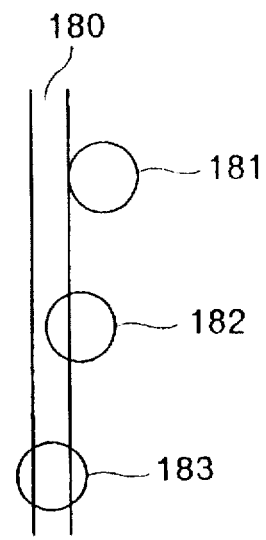
FIGS. 8a to 8c are views showing the positional relation between image spots on an optical disk and an information track in the optical pickup of the first embodiment.
Figure 8B:
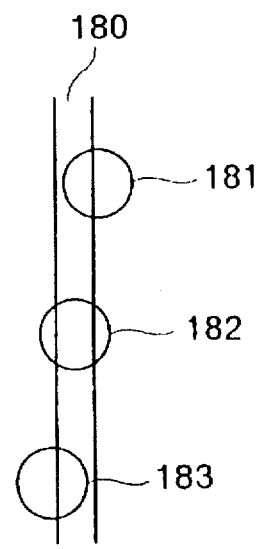
Figure 8C:
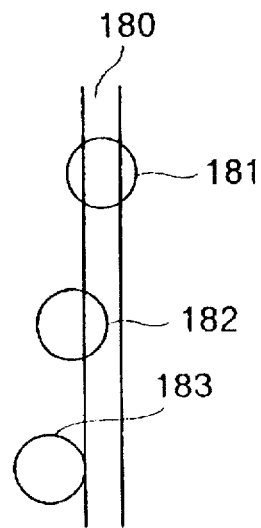

FIG. 8 shows the positional relation between the image spots formed on the optical disk and an information track 180 on the optical disk in the optical pickup of the first embodiment. Image spots 181 and 183 of the two side beams are disposed symmetrical with each other about an image spot 182 of the main beam in the direction of the track, and are offset respectively in opposite directions slightly with respect to the information track 180, as shown in FIG. 8b. The side beam spots 181 and 183 in FIGS. 8a to 8c reach the light-receiving sensors 176 and 177 on the sensor base plate 119, respectively, along similar optical paths as described above for the astigmatism method, thereby forming spots 184 and 186, respectively. Here, photoelectric currents, produced respectively at the light-receiving sensors 176 and 177 at this time, are represented by I176 and I177, respectively. When the information track 180 is deviated left with respect to the image spot 182 as shown in FIG. 8a, the image spot 183 is disposed substantially just on the information track 180, so that the intensity of the reflected light thereof decreases. On the other hand, the image spot 181 is deviated from the information track 180, so that the reflected light thereof increases. In contrast, when the information track 180 is deviated right with respect to the image spot 182 as shown in FIG. 8c, a phenomenon reverse to the foregoing occurs, and more specifically the amount or intensity of the reflected light of the image spot 181 decreases while the amount of the reflected light of the image spot 183 increases.

Therefore, as will be appreciated from the circuit diagram of FIG. 4, the tracking error signal (T.E.) can be obtained if the circuit is so designed as to satisfy the following formula:

$$T.E.=I176-I177$$

The above tracking error signal detection method is known as a 3-beam method.

Next, a tracking detection method depending on a push-pull method will now be described.

In the push-pull method, track deviation information on the image spots formed by the objective lens 109 is found through the balance between the light amounts of the +first order diffraction light and the −first order diffraction light produced at the guide track and recording pits on the surface of the optical disk 110, thereby obtaining the tracking error signal. The reflected light from the image spot 182 in FIGS. 8a–c reaches the light-receiving sensor 172 on the sensor base plate 119 along the path as described above, and forms a spot 185 thereon. With respect to the spot 185 on the light-receiving sensor 172 in FIG. 4, the return light beams of the zero-order diffraction light and the −first order diffraction light, produced at the surface of the optical disk 110, overlap each other at an area 185a, and an area 185b receives only the zero-order diffraction light, and the return light beams of the zero-order diffraction light and the +first order diffraction light overlap each other at an area 185c. Therefore, the balance between the amount of the light contained in the area 185a and the amount of the light contained in the area 185c is detected by the differential between the detected values of the light-receiving sensors 172a and 172c, thereby obtaining the track deviation information. If the photoelectric current produced by the sensor 172a upon reception of the light is represented by $I172a$, and the photoelectric current produced by the sensor 172c upon reception of the light is represented by $I172c$, then the tracking error signal (T.E.) is obtained from the following formula based on the outputs of the light-receiving sensors 172a and 172c:

$$T.E.=I172a-I172c \tag{1}$$

The diffusion angle of the light, emitted from the semiconductor laser chip 103 to be incident on the diffusion angle conversion hologram 106, is represented by $\theta 1$, and the diffusion angle of the outgoing light from the diffusion angle conversion hologram 106 is represented by $\theta 2$. It is preferred that the diffusion angle $\theta 1$ of the light incident on the diffusion angle conversion hologram 106 should be large so that a high light-utilizing efficiency (that is, the ratio of the light amount, required for the image formation, to the total amount of the light emitted from the semiconductor laser chip) necessary for erasing the recording can be secured. Its lower limit is expressed by the following formula:

$$\sin\theta 1 > 0.18$$

If the diffusion angle $\theta 1$ is increased too much, the effective area of the diffusion angle conversion hologram 106 must be increased, and the diameter of the light beam is increased after the conversion of the diffusion angle, and the diameters of all of the light beams all the way to the sensor base plate 119 are increased. As a result, the optical system can not be constructed properly. The upper limit thereof is expressed by the following formula:

$$\sin\theta 1 < 0.3$$

On the other hand, the light is incident on the first and second polarized beam splitters, the analyzer and so on with the diffusion angle generally equal to the diffusion angle $\theta 2$ of the outgoing light from the diffusion angle conversion hologram 106, and therefore it is preferred that the diffusion angle $\theta 2$ should be small so that the optical phase at the polarization beam splitters and the analyzer can be controlled easily. Its upper limit is expressed by the following formula:

$$\sin\theta 2 < 0.17$$

Furthermore, the light reaches the objective lens with the diffusion angle generally equal to the diffusion angle $\theta 2$ of the outgoing light from the diffusion angle conversion hologram 106, and therefore the magnification of the objective lens 109 is limited by the diffusion angle $\theta 2$. If the diffusion angle $\theta 2$ is too small, the image distance of the objective lens 109 is increased, and the distance between the optical guide member 104 and the objective lens 109 becomes large, so that the overall construction of the optical system is increased. Its lower limit is expressed by the following formula:

$$\sin\theta 2 > 0.06$$

Therefore, it is preferred that the diffusion angle conversion hologram 106 be so designed that the light emitted from the semiconductor laser chip 103 can satisfy the following formulas:

$$0.18 < \sin\theta 1 < 0.3 \tag{2}$$

$$0.06 < \sin\theta 2 < 0.17 \tag{3}$$

As described above, the diffusion angles $\theta 1$ and $\theta 2$ are determined by the formulas (2) and (3), respectively, and the diffusion angle is reduced from $\theta 1$ to $\theta 2$. By doing so, the high efficiency of use of the light necessary for erasing the recording can be ensured, and the optical phase can be easily controlled, and the deterioration of the C/N ratio is prevented, and the optical system can be of a compact construction.

More preferably, the diffusion angle conversion hologram 106 is so designed that the light emitted from the semiconductor laser chip 103 can satisfy the following formulas:

$$0.18 < \sin\theta 1 < 0.23$$

$$0.09 < \sin\theta 2 < 0.15$$

In this embodiment, although the three beams are produced by the reflective-type diffraction grating 107, thereby obtaining the tracking error signal by the 3-beam method, there can be used, instead of the diffraction grating 107, a push-pull method in which another reflecting film is used, and the tracking error is obtained by calculation as in the above formula (1) without producing the three beams.

In this embodiment, the light emitted from the semiconductor laser chip 103 is reflected once by the diffusion angle conversion hologram 106 formed on the second inclined surface 105b, and then is reflected once by the diffraction grating 107 formed on the first inclined surface 105a. Thus, this emitted light is reflected twice, and then is guided to the first beam splitter film 108. However, the emitted light may be reflected by a plurality of times at the first and second inclined surfaces. In such a case, the diffusion angle conversion hologram 106 and the diffraction grating 107 may be formed on either of the first and second inclined surfaces.

In this embodiment, the astigmatism-generating hologram 124 may be formed at either of the positions of the reflecting films 125 and 126, in which case similar effects as described above can be achieved, and the servo signals can be detected. Furthermore, the use of the reflecting film 125 or the reflecting film 126 may be omitted, in which case the light can transmit through the third inclined surface 105c, and is guided to the light-receiving sensor 172, 176 or 177.

In this embodiment, although the diffusion angle conversion hologram 106 of the reflective type and the astigmatism-generating hologram 124 of the reflective type are used, reflecting lenses achieving similar effects can be used instead of these holograms.

In this embodiment, although the focus error signal is obtained by the astigmatism method using the astigmatism-generation hologram 124, there may be used, instead of the astigmatism-generating hologram 124, a reflective-type hologram or a reflective-type lens with one or more patterns which causes the reflected light 123 from the beam splitter film 116 to form an image on the sensor base plate 119 so as to obtain the focus error signal by a knife-edge method or a Foucault method.

A method of producing the optical guide member 104 of this embodiment will now be described with reference to FIGS. 9a to 22d. For forming the optical guide member 104 of this embodiment, three parallel flat plates or substrates and V-shaped groove plate 118 with a V-shaped groove are bonded together through adhesive layers to form an assembly block, and the assembly blocks are bonded together through adhesive layers to form a composite block, and the composite block is cut obliquely relative to the bonding surfaces of the blocks to provide a planar block. Bar blocks are formed from this planar block, and the optical guide member 104 of each embodiment is formed from this bar block by cutting.

Figure 9A:
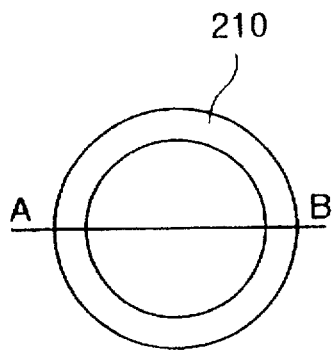
FIGS. 9a to 9f are views showing a method of forming V-shaped groove by grinding in the optical pickup of the first embodiment.
Figure 9B:
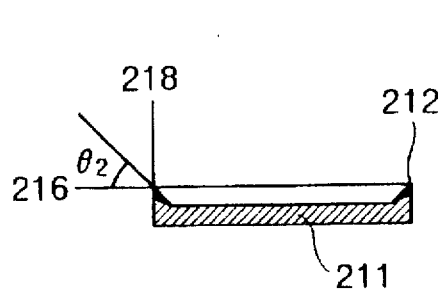
Figure 9C:
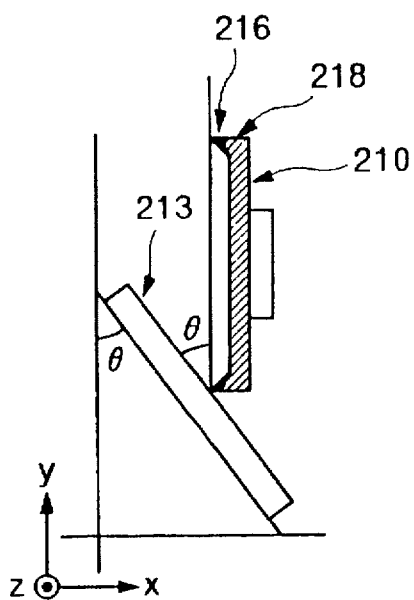
Figure 9D:
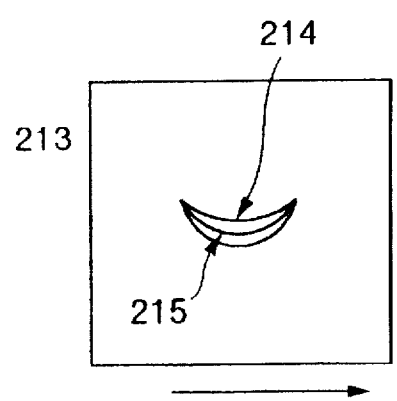
Figure 9E:
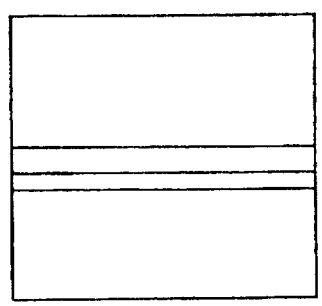
Figure 9F:
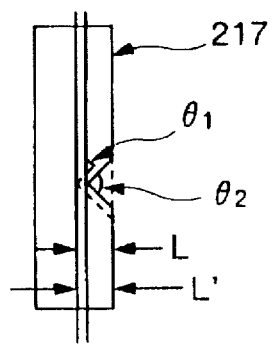
Figure 10A:
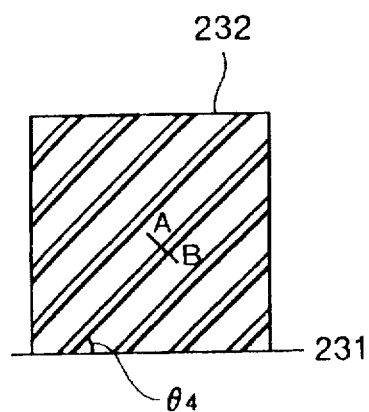
Figs. 10a to 10c are views showing a method of forming the V-shaped groove in the optical pickup of the first embodiment.
Figure 10B:
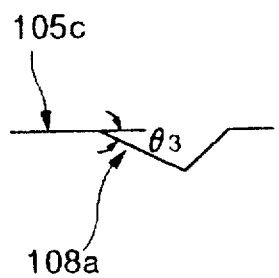
Figure 10C:
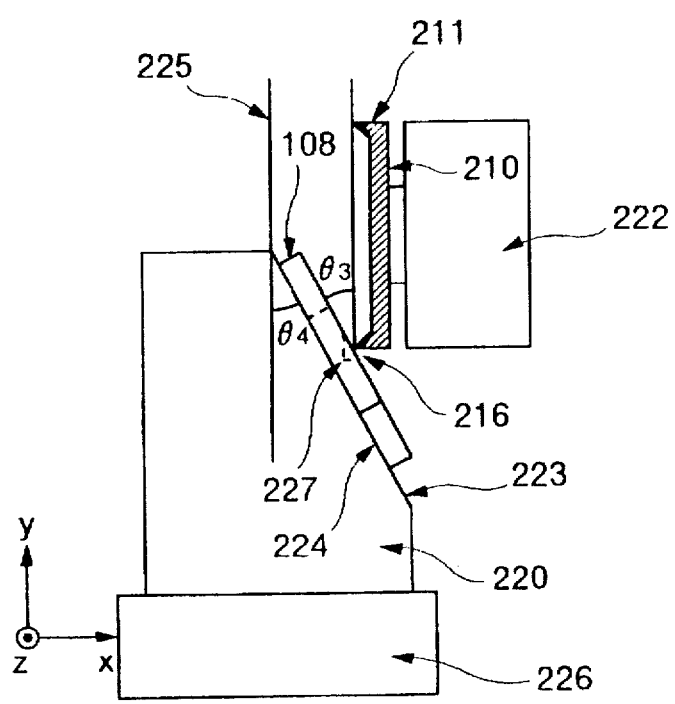

In this embodiment, for forming the V-shaped groove plate 118, a grinding method and a glass molding method were used. For forming the V-shaped groove by the grinding method of this embodiment, a cup-shaped grinding stone is used. The principle of the formation of the V-shaped groove by the cup-shaped grinding stone 210 will now be described with reference to FIGS. 9a to 9f. FIG. 9a is a front-elevational view of the cup-shaped grinding stone 210, and FIG. 9b is a cross-sectional view taken along the line A–B of FIG. 9a. An abrasive grain layer 212 is formed on a base of the cup-shaped grinding stone, and the apex angle of the abrasive grain layer is generally 45°. FIG. 9c shows the manner of grinding a plate 213 using the grinding stone 210. The cup-shaped grinding stone 210 is rotated at high speed, and the plate 213 is fed in an X-axis direction (FIG. 9c), so that a ground recess 214 is formed in the plate 213 as shown in FIG. 9d. Then, the plate 213 is fed in a Z-axis direction (FIG. 9c), so that a V-shaped groove is formed in the plate 213, the apex or bottom of the V-shaped groove being disposed at the most deeply-ground point 215 of the ground recess 214. FIG. 9e is a front-elevational view of the plate 213 which has been subjected to grinding while fed in the Z-axis direction, and FIG. 9f is a side-elevational view thereof. The V-shaped groove, having the apex lying on a line passing through the points 215, is formed. The angle θ1 of the V-shaped groove is obtained by setting the plate 213 at an angle θ1 with respect to a front surface 216 of the cup-shaped grinding stone 210. It will be readily appreciated that the depth L of the V-shaped groove is determined by the amount of feed in the X-axis direction. With respect to the depth L of the V-shaped groove, there may be used a method in which a V-shaped groove having a depth L' is first formed by grinding, and then grinding and lapping are applied to a surface 217 of the plate 213, thereby forming the V-shaped groove into a depth L. The grinding of the plate 213 by the cup-shaped grinding stone 210 proceeds with the plate 213 and the abrasive grain layer 212 held generally in line-like contact with each other. By feeding the plate 213 in this line-like contact condition, the V-shaped groove is formed, and therefore with respect to the apex angle θ2 of the V-shaped groove, the angle between the front surface 216 and a side surface 218 of the grinding stone (see FIG. 9b) can be accurately transferred irrespective of a load amount of the cup-shaped grinding stone and a warp of the cup-shaped grinding stone. Next, the grinding method used for the V-shaped groove plate 118 of the first embodiment will now be described with reference to FIG. 10. FIG. 10a is a front-elevational view of the V-shaped groove plate 118, and FIG. 10b is a cross-sectional view taken along the line A–B of FIG. 10a. A V-shaped groove 232 is formed at an angle θ4 with respect to a side surface 231 of the plate, and the angle between a surface 108a of the V-shaped groove and the third inclined surface 105c is set to θ3. A plate-bonding surface 223 of a plate grinding jig 220 is set at an angle θ3 with respect to the front surface 216 of the cup-shaped grinding wheel, and the V-shaped groove plate 118 is fixed to the bonding surface 223 of the plate grinding jig 220 through wax 224 in such a manner that the angle between the side surface 231 of the plate and a Z-axis direction of a microgrinder plate grinding jig fixing stage 226 (hereinafter referred to merely as "jig stage") is set to θ4. The jig stage 226 is moved in X-axis, Y-axis and Z-axis directions (FIG. 10c). The jig stage 226 is adjusted to the position of a grinding point 227 of the plate in the Y-axis, and the cup-shaped grinding wheel 210 is rotated at a high speed, and the jig stage 226 is moved in the X-axis direction and the Z-axis direction to grind the plate, thereby forming the V-shaped groove. The mesh size of the cup-shaped grinding wheel 210 was #2500–#4000, and a surface roughness of Rmax 0.02µwas obtained.

The method of manufacturing the optical function elements, formed on the three plates and the V-shaped groove plate 118 which jointly constitute the assembly block for forming the optical guide member of this embodiment, will now be described with reference to FIGS. 11 to 18. The optical pickup used in this embodiment will be first described with reference to FIG. 11.

The reflective-type diffraction grating 107 and a first bonding position-registration marker 244a are formed on a first surface 105a of the first plate 241. The reflective-type diffusion angle conversion hologram 106, a first depth marker 246a, the first beam splitter film 108 and a second bonding position-registration marker 244b are formed on a second surface 105b of the first plate 241. The reflecting film 122, a second depth marker 246b, the reflective-type astigmatism-generating hologram 124 and a third bonding position-registration marker 244c are formed on a first surface 105b of the second plate 242. The second beam splitter film 116, the polarized light splitting film 121, the reflecting film 125 and a fourth bonding position-registration marker 244d are formed on a second surface 105c of the second plate 242. A fifth bonding position-registration marker 244e, a first cutting marker 245a and a second cutting marker 245b are formed on a first surface 105d of the third plate 243. A sixth bonding position-registration marker 244f is formed on a second surface 105a of the third plate 243. A seventh bonding position-registration marker 244g is formed on a first surface 105c of the V-shaped groove plate 118, and an eighth bonding position-registration marker 244h is formed on a second surface 105d of the V-shaped groove plate 118. A phase adjustment reflecting film 248 is formed on a slanting surface 108a of the V-shaped groove. The method of forming each of the optical function elements to be mounted on the respective plates will now be described. The formation of the first bonding position-registration marker 244a will be described with reference to FIG. 12. A first marker-forming material 251a for the first bonding position-registration marker 244a is formed on the first surface 105a by a vacuum film-forming device. The first marker-forming material 251a for the first bonding position-registration marker 244a is made of metal such as Ti, Cr, Cu, Au, Ag, Ta, or Al. It is particularly preferred from the viewpoints of the cost and the time and labor that the first marker-forming material 251a is a material capable of wet etching. Here, a Ti film is used. A pattern 252 for the first bonding position-registration marker 244a is formed by photolithography, and then the side etching of the pattern is suppressed by wet etching (spray etching), and that portion except for the pattern is removed, and the pattern 252 is removed, thereby forming the first bonding position-registration marker 244a. Next, a method of forming the second bonding position-registration marker 244b will be described with reference to FIG. 13. A second marker-forming material 251b for the second bonding position-registration marker 244b is formed on the second surface 105b by a vacuum film-forming device. Preferably, the marker-forming material 251b is capable of etching, and is made of Ti, Cr, Cu, Au, Ag, Ta or Al. Preferably, the second marker-forming material 251 is made of a material which can be etched without affecting the first marker-forming material 251a. Here, a Cr film is used. An etchant for the Cr film used here is composed of 17 g of cerium ammonium nitrate, 5 cc of perchloric acid and 100 cc of pure water. The Cr etchant can etch the Cr film without etching the Ti film, and therefore the process can be continued without damaging the first bonding position-registration marker 244a. The second bonding position-registration marker 244b must be formed, using the first bonding position-registration marker 244a as a reference. In pattern exposure, a pattern 252 for the second bonding position-registration marker 244b is formed by photolithography using a double-sided mask aligner. That portion except for the pattern is removed by wet etching (spray etching), and then the pattern 252 is removed, thereby forming the second bonding position-registration marker 244b. Although the wet etching is used here, the process can be carried out using a dry etching technique less liable to cause the side etching, such as ion milling etching and reactive etching. Also, the pattern may be formed by a lift-off process.

The methods of forming the third, fifth and seventh bonding position-registration markers 244c, 244e and 244g (FIG. 11) are the same as the method of forming the first bonding position-registration marker 244a. The method of forming the fourth and sixth bonding position-registration markers 244d and 244f (FIG. 11) is the same as the method of forming the second bonding position-registration marker 244b.

Figure 14:
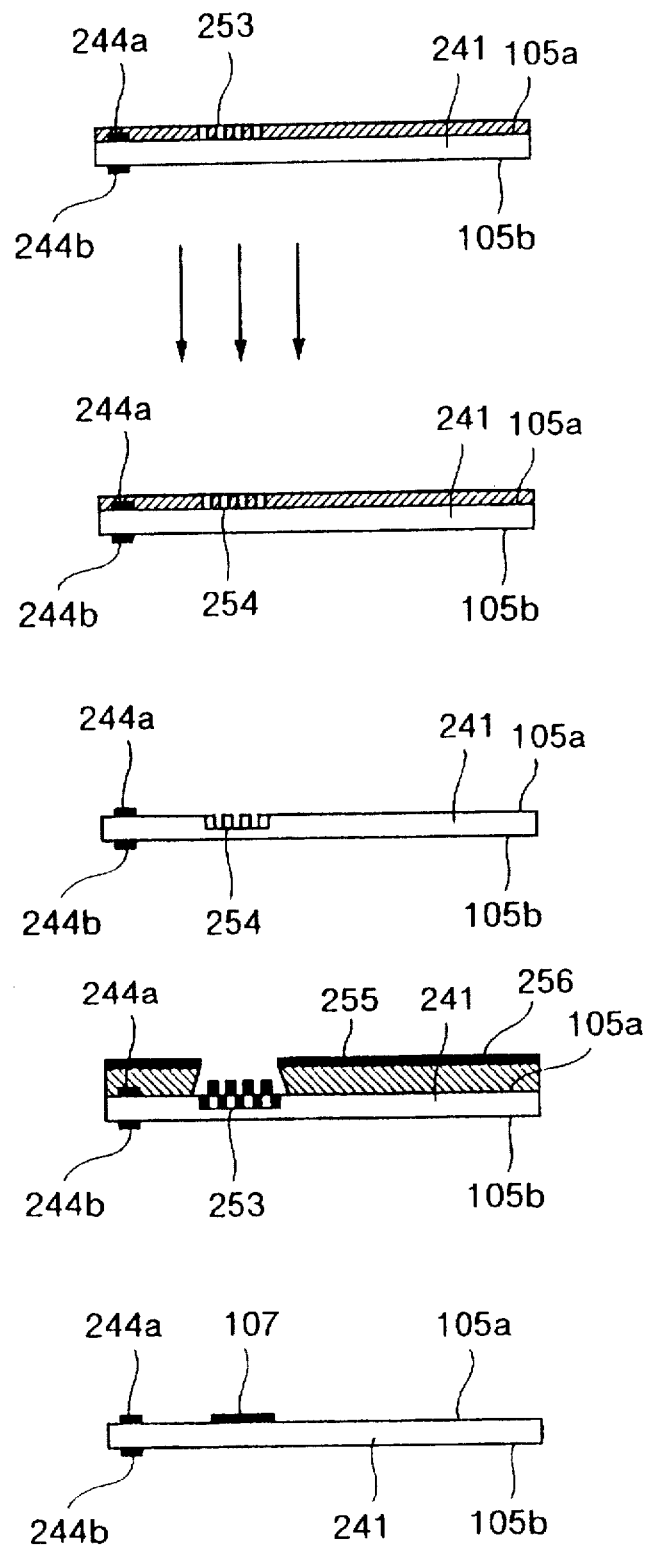
FIG. 14 is a view showing a method of forming a reflective-type diffraction grating in the optical pickup of the first embodiment.

A method of forming the reflective-type diffraction grating 107 on the first surface 105a of the first plate 241 will be described with reference to FIG. 14. Using the first bonding position-registration marker 244a as a reference marker, a diffraction grating pattern 253 for the reflective-type diffraction grating 107 is formed on a predetermined portion of the first surface 105a by photolithography. Etching is made into a predetermined depth using a reactive etching process or an ion milling etching process. After the etching is completed, the diffraction grating pattern 253 is removed by oxygen plasma asher or an organic solvent, thereby forming a diffraction grating 254 on the first surface 105a of the first plate 241. Further, a diffraction grating reflecting film pattern 256 is formed so as to form a reflecting film 255 on the diffraction grating 254 by a lift-off process. A negative-type photoresist is used for the diffraction grating reflecting film pattern 256 so that the pattern can have a reversely-tapering configuration in order to facilitate the lift-off. Alternatively, the pattern is formed using a photoresist of the negative-positive inverted type, a typical example of which is AZ-5218E of Hoechst. Here, the diffraction grating reflecting film pattern 256 is formed using AZ-5218E of Hoechst. After the diffraction grating reflecting film pattern 256 is formed, the reflecting film 255 for the reflective-type diffraction grating 107 is formed by a vacuum film-forming device. Here, this film is formed by vacuum vapor deposition. The reflecting film 255 is made of metal having a high reflectance, such as Ag, Al, Cu or Au, so that the reflective-type diffraction grating 107 can achieve a high efficiency. Particularly, Ag is advantageous from the viewpoint of the cost, and has a high reflectance while it has an absorption coefficient of about 5.1 with respect to a wavelength λ0 (790 nm) (which is the central wavelength in the design). Therefore, Ag can achieve a high reflectance with a very small thickness, and the left-off can be easily carried out in the left-off process. After the reflecting film material is formed, the left-off is effected using an organic solvent or a remover solvent, thereby forming the reflective-type diffraction grating 107. Although the pattern for the reflecting film 255 is formed by the left-off process, it may be formed by a pattern formation method and a wet etching (spray etching) method as in the formation of the first bonding position-registration marker 244a. With respect to the etching method, dry etching may be used.

Figure 15A:
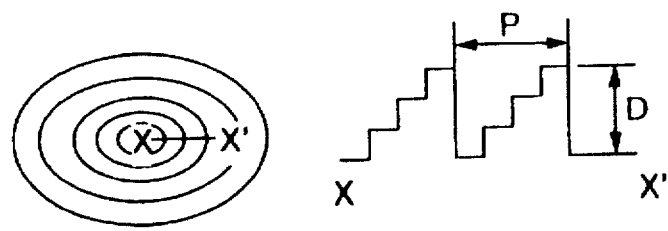
FIGS. 15a to 15d are views showing a method of forming a reflective-type diffusion angle conversion hologram element in the optical pickup of the first embodiment.
Figure 15B:
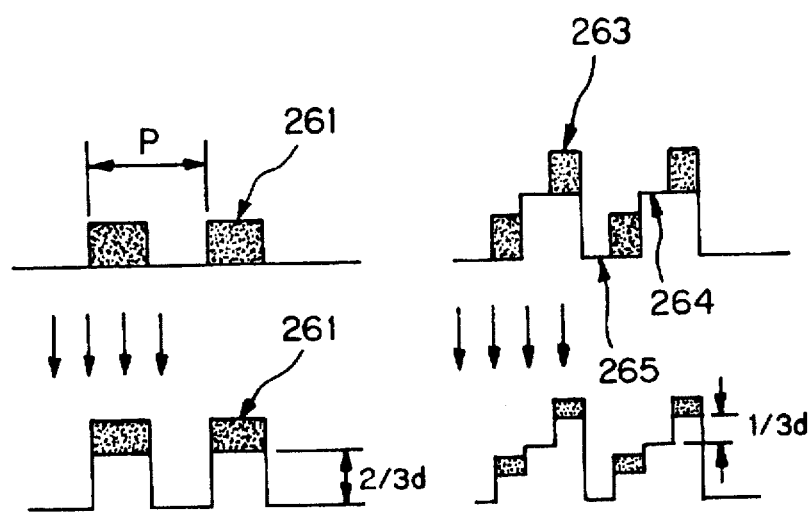
Figure 15C:
Figure 15D:
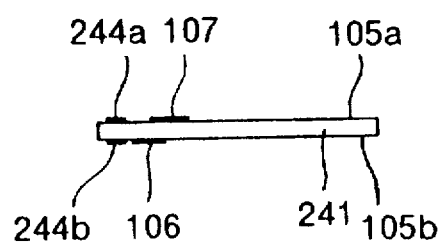

Next, a method of forming the reflective-type diffusion angle conversion hologram 106 will be described with reference to FIGS. 15a to 15d. In this embodiment, in order to enhance the diffraction efficiency of the diffusion angle conversion hologram 106, a 4-step hologram is formed. FIG. 15a is a front-elevational view of the 4-step hologram, and FIG. 15b is a cross-sectional view taken along the line X–X' of FIG. 15a. The 4-step configuration is formed by effecting two hologram pattern-forming steps and two hologram pattern etching steps. FIG. 15c shows a process flow for the formation of the 4-step hologram. In the first pattern formation, a 1st-step hologram pattern 261 is formed, having a duty ratio of 50/50 relative to a 4-step hologram pitch P (hereinafter referred to merely as "hologram pitch"). The 1st etching is effected through an amount of about ⅔ of a final etching amount D. The etching is carried by a method as described for the reflective-type diffraction grating 107. After the etching is completed, the 1st-step hologram pattern 261 is removed by oxygen plasma asher or an organic solvent, thereby forming a 1st-step hologram 262. In the second pattern formation, a 2nd-step hologram pattern 263 is formed on the 1st-step hologram 262. The 2nd-step hologram pattern 263 is such that the duty ratio of a 1st-step hologram line portion 264 of the 1st-step hologram 262 to a 1st-step space portion 265 thereof is 50/50. The second etching is effected in an amount of about ⅓ of the final etching amount D. The etching is carried out by a method as described for the reflective-type diffraction grating 107. After the etching is completed, the 2nd-step hologram pattern 263 is removed by oxygen plasma asher or an organic solvent, thereby forming a 2nd-step hologram 266. Further, a reflecting film 267 is formed, thereby forming the reflective-type diffusion angle conversion hologram 106 in the form of the 4-step hologram. For the reason described above for the reflective-type diffraction grating 107, the reflecting film 267 is made of Ag. The reflecting film 267 made of Ag is formed by a lift-off process as described above for the reflecting film 255 of the reflective-type diffraction grating 107. FIG. 15d shows the reflective-type diffusion angle conversion hologram 106 formed on the second surface 105b of the first plate 241.

The reflective-type astigmatism-generating hologram 124 (FIG. 11) is the reflective-type, 4-step hologram, and is formed by a method as described above for the reflective-type diffusion angle conversion hologram 106, although the hologram 124 is different in pattern configuration from the hologram 106.

Figure 11:
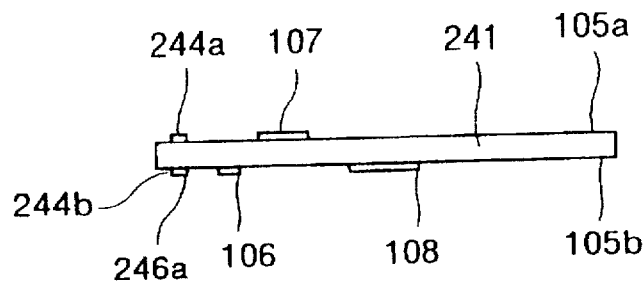
FIG. 11 is a view showing the optical pickup of the first embodiment.
Figure 11:
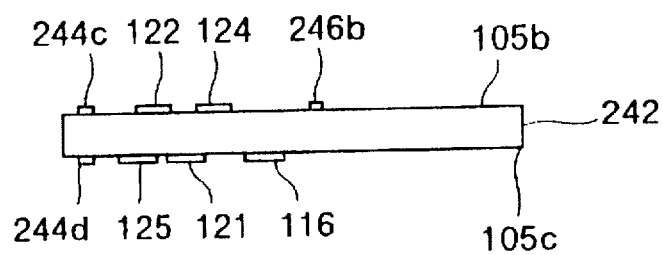
Figure 11:
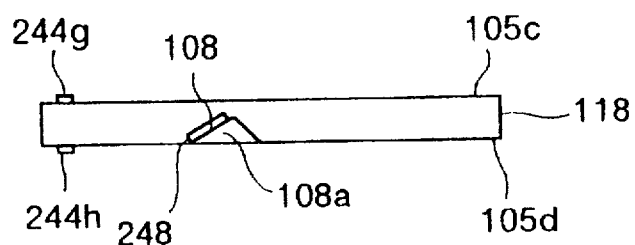
Figure 11:
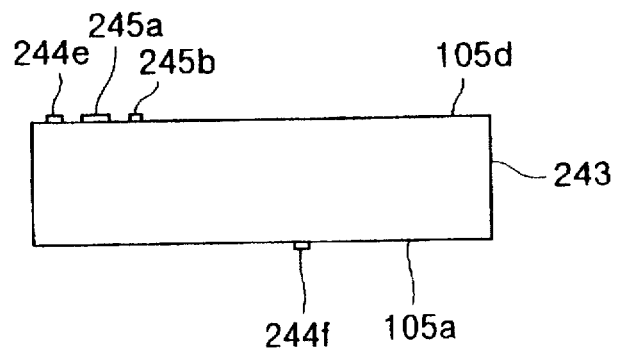
Figure 12:
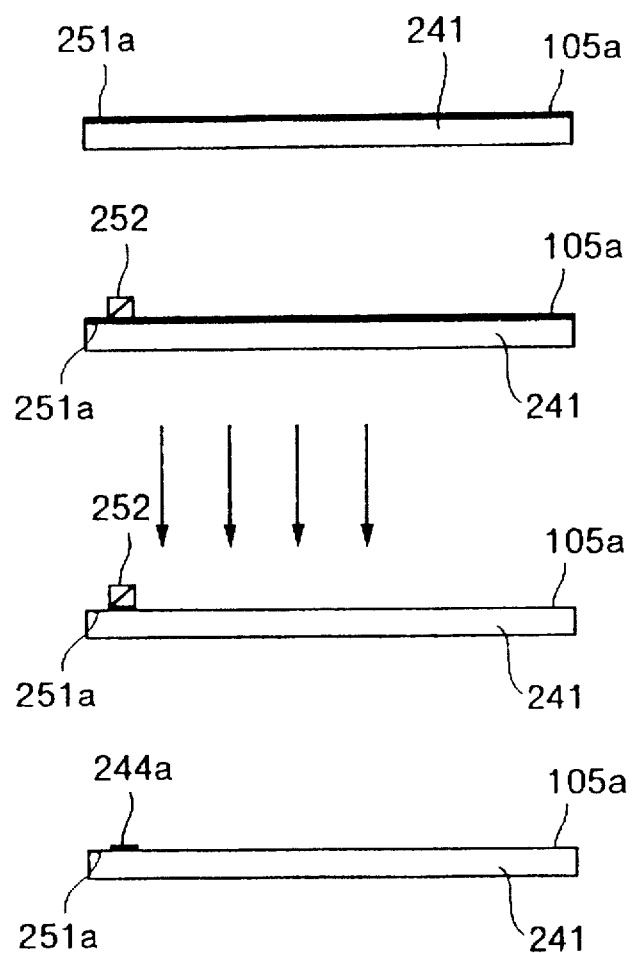
FIG. 12 is a view showing a method of forming a bonding position-registration marker in the optical pickup of the first embodiment.
Figure 13:
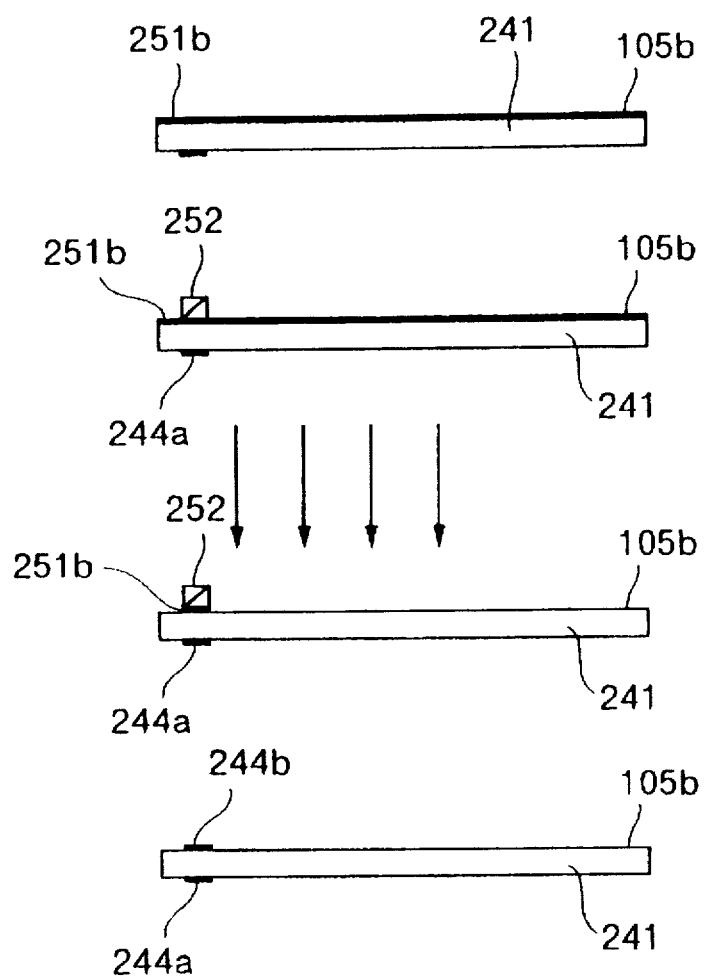
FIG. 13 is a view showing a method of forming a bonding position-registration marker in the optical pickup of the first embodiment.
Figure 16A:
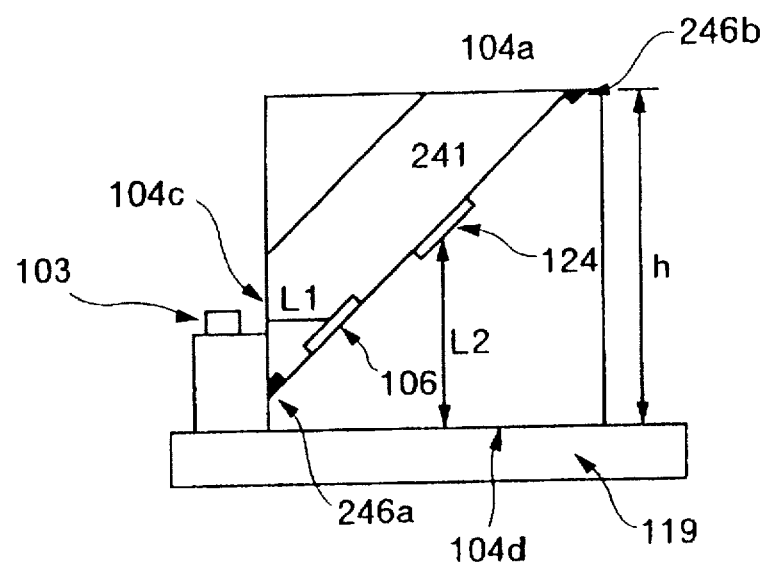
FIGS. 16a to 16d are views showing a method of forming a reflecting film of the reflective-type diffraction grating and a first depth marker in the optical pickup of the first embodiment.
Figure 16B:
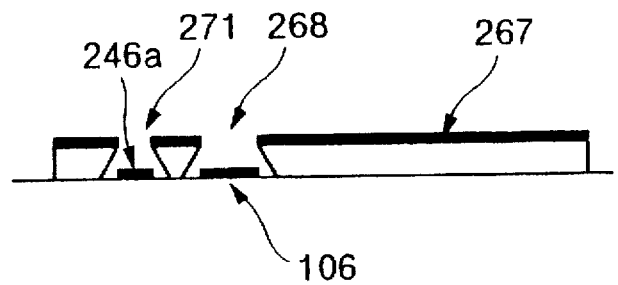
Figure 16C:
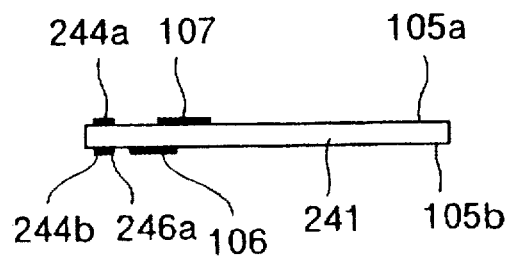
Figure 16D:
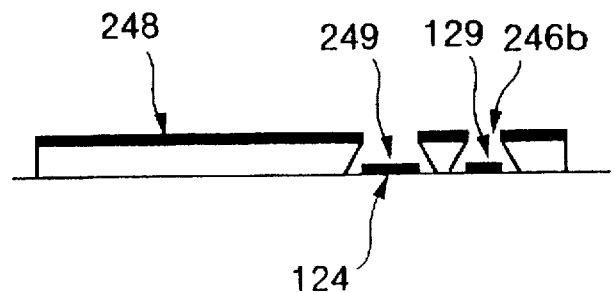

Next, a method of forming the first depth marker 246a and the second depth marker 246b will be described with reference to FIGS. 16a to 16d. The purpose of the first depth marker 246a is to accurately determine the distance L1 between the surface 104c and the reflective-type diffusion angle conversion hologram 106 at the final step of the process so as to accurately determine the distance between the semiconductor laser chip 103 (FIG. 16a) and the diffusion angle conversion hologram 106. Preferably, the first depth marker 246a and the reflective-type diffusion angle conversion hologram 106 are formed at the same time on the same surface, and the first depth marker 246a is made of a material considerably different in refractive index from the first plate 241, and the amount of processing can be clearly judged during the processing. Here, the first plate 241 is formed of BK-7 having a refractive index of about 1.511, and therefore the first depth marker 246a is formed using the Ag material, used to form the reflecting film 267 of the reflective-type diffusion angle conversion hologram, at the same time when the reflecting film 267 is formed. Therefore, a first depth marker pattern 271 is formed on the mask on which the reflecting film pattern 268 of the reflective-type diffusion angle conversion hologram is formed, and the first depth marker 246a is formed simultaneously with the formation of the reflecting film 267. FIG. 16b is a view showing a condition in which the first depth marker pattern 271 and the reflective film pattern 268 of the reflective-type diffusion angle conversion hologram are formed, and the reflecting film 267 of the reflective-type diffusion angle conversion hologram is formed. FIG. 16c is a side-elevational view of the first plate 241 having the first depth marker 246a formed thereon. For similar reasons, the second depth marker 246b is formed simultaneously with the formation of a reflecting film 248 of the reflective-type astigmatism-generating hologram 124 (FIG. 11). The second depth marker 246b is provided for limiting the distance L2 between the reflective-type astigmatism-generating hologram 124 and the surface 104d of the sensor base plate 119. At the final step of the process, the distance up to the surface 104a is limited by the second depth marker 246b, and the final height h of the optical guide member 104 is determined using the surface 104a as a reference. Therefore, a second depth marker pattern 249 is formed on the mask on which a reflecting film pattern 129 for the reflective-type astigmatism-generating hologram is formed, and the second depth marker 246b is formed simultaneously with the formation of the reflecting film 248 of the reflective-type astigmatism-generating hologram. FIG. 16d is a view showing a condition in which the second depth marker pattern 249 and the reflecting film pattern 129 for the reflective-type astigmatism-generating hologram are formed, and the reflecting film 248 of the astigmatism-generating hologram is formed.

The first and second cutting markers 245a and 245b and the reflecting films 122 and 125 (FIG. 11) can be formed by a method as described above for the reflecting film 255.

Next, the formation of the first beam splitter film 108 on the second surface 105b of the first plate 241 will be described. In this embodiment, the first beam splitter film 108 is of the S polarized-light incidence type, and has substantially 100% transmittance for the P polarized-light and a predetermined transmittance for the S polarized-light, and a relative phase difference between the S polarized light and P polarized-light of the transmitted light must be substantially zero. Therefore, generally, a beam splitter film having polarization selectivity is formed of a dielectric multi-layer film. The dielectric multi-layer film is made of such film materials that internal stresses, developing during the formation of the individual films by the materials, exhibit tensile stresses and compressive stresses and that the internal stresses of these films cancel each other during the formation of the multi-layer film. Preferably, an expansion coefficient of the plate on which the multi-layer film is formed is generally in the middle of the range of the expansion coefficients of the film materials to be combined together. In view of these points, it is necessary to prevent separation, the lowering of the precision of the plate and cracks during the formation of the multi-layer film. In view of these, typical examples of the combination are $TiO_2/SiO_2$, $Ta_2O_5/SiO_2$, $Al_2O_3/SiO_2$ and $ZnS/MgF_2$. In the design of the beam splitter film, a suitable combination is selected in accordance with the designed refractive index value. Particularly in this embodiment in which the angle of incidence is 45°, and the refractive index ng of the incident light is BK-7, the Brewster conditions can be satisfied by the combination of $Al_2O_3/SiO_2$, and reflection for the P polarized-light can be reduced to substantially zero, so that substantially 100% transmittance can be obtained.

A formula for the Brewster conditions is as follows:

$$(ng)2=2\times(nh)2\times(nl)2/((nh)2+(nl)2) \quad (4)$$

If ng=1.511, nh (refractive index of $Al_2O_3$)=1.580 and nl (refractive index of $SiO_2$)=1.450 are provided, the formula (4) is satisfied. On the other hand, the optical film thickness relative to the design central wavelength λ0 is determined as follows:

$$nH,L\times d=\lambda 0/(4\times cos\theta t)$$

θt represents the refractive angle to each thin film. The refractive angle can be determined by the following formula according to the Snell law:

$$ng\times sin\theta 0=nH,L\times sin\theta t$$

θ0 represents the angle of incidence. However, these film thickness determinations vary depending on the selected reflectance of the S polarized-light, and also are adjusted in order to bring the relative phase difference between the S polarized-light and the P polarized-light to substantially zero. With these combinations, the beam splitter film can be formed without causing the reflection of the P polarized-light due to the film thickness precision at the film-forming stage. However, the design can be made using the above-mentioned combinations of the constituent materials. Particularly, there is the Thelen method enabling such design. Furthermore, with the construction of this embodiment, the light beam incident on the first polarization beam splitter film 108 is the finite light beam converted by the reflective-type diffusion angle conversion hologram 106, and therefore the design is so made that spectral characteristics of the S polarized-light and the P polarized-light for this infinite light beam can be obtained, and that the phase difference to be produced can be reduced to a minimum. The first beam splitter film 108 is formed by a lift-off process as described above for the reflecting film 255 of the reflective-type diffraction grating 107.

Next, explanation will be made of the formation of the second beam splitter film 116 on the second surface 105c of the second plate 242. The second beam splitter film 116 is formed using a design method and pattern formation method as described above for the first beam splitter film 108. The second beam splitter film 116 is formed by a method as described above for the first beam splitter film 108.

Next, a method of forming the polarized light splitting film 121 will be described. The polarized light splitting film 121 of this embodiment has substantially 100% reflectance for the S polarized-light with a design central wavelength λ0, and also has substantially 100% transmittance for the P polarized-light. Therefore, generally, the polarized light splitting film 121 is composed of a dielectric multi-layer film. Constituent materials of the polarized light splitting film 121 are determined for the same reasons given for the first beam splitter film 106. The angle of incidence on the polarized light splitting film 121 of this embodiment is 53°, and a combination of $TiO_2/SiO_2$ is used. Since the polarized light splitting film transmits substantially 100% of the P polarized-light therethrough, an optical admittance Yep of the polarized light splitting film 121 need to be equal to an optical admittance YO of the incident light beam medium. Therefore, the design is made using the Thelen method. The Thelen method will be described briefly. In the Thelen method, with respect to an optical admittance Ym of a multi-layer film (expressed by the following formula) constituting a basic film construction in the design of a long-wavelength transmission filter, is changed by an optical admittance Yn of another basic multi-layer film so as to make an optical admittance of the overall multi-layer film (here, the optical admittance Yep of the polarized light splitting film 121) is made equal to the optical admittance YO of the incident light beam medium.

$$(0.5H \times L \times 0.5H)m \tag{5}$$

H and L represent optical film thicknesses of high- and low-refractive index materials, respectively, and m represents the number of repetition. In order that the optical admittance Ym of the multi-layer film, expressed by the formula (5), can be made equal to YO at the design central wavelength λ0, an adjustment layer, represented by the following formula (6), is provided. Multi-layer films, having the adjustment layer of the basic film construction (H', L')n, are provided at the incident light beam medium side and the outgoing light beam medium side, respectively, and the film thicknesses H, L, H' and L' are so determined that the transmittance for the P polarized-light can be substantially 100%.

$$(0.5H' \times L' \times 0.5H')n \times (0.5H \times L \times 0.5H)m \times (0.5H' \times L' \times 0.5H')n \tag{6}$$

The polarized light splitting film 121 is formed by a method as described above for the formation of the first polarization beam splitter film 108.

Figure 17:
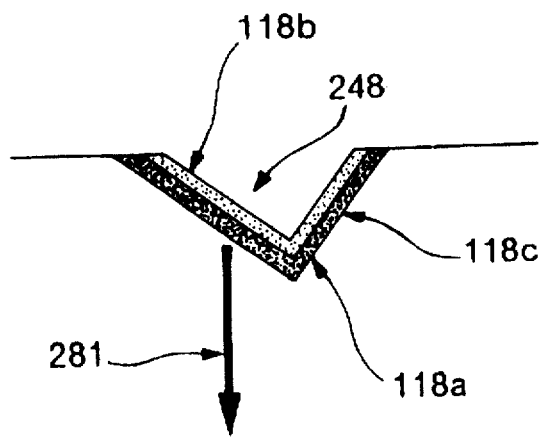
FIG. 17 is a view showing a method of forming a phase-adjusting reflecting film in a V-shaped groove in the optical pickup of the first embodiment.

Next, a reflecting film 118b formed on the V-shaped groove plate 118 and the V-shaped groove surface 118a will be described with reference to FIG. 17. The reflecting film 118b must exhibit high reflectance for the S polarized-light and the P polarized-light, and also must reduce the relative phase difference between the S polarized-light and the P polarized-light to substantially zero. In this embodiment, the angle of incidence on the V-shaped groove surface 118a is 45°. It is possible that the reflecting film 118b is composed of a dielectric multi-layer film as is the case with the first polarization beam splitter film 108 and the polarized light splitting film 121. In such a case, however, the number of laminated layers must be increased in order to achieve high reflectance, and the formation of the pattern becomes difficult. Here, metal having high reflectance, such as Ag, Al, Cu and Au, is used as the material for the reflecting film 118b. Particularly, Ag is advantageous from the viewpoint of the cost, and exhibits high reflectance, and besides has an absorption coefficient of about 5.1 for the design central wavelength λ0 (790 nm). Therefore, high reflectance can be achieved with a very small film thickness, and lift-off can be easily effected in a lift-off process. However, Ag has a refractive index ng of 0.09 to 5.45 i at the design central wavelength λ0, and the relative phase difference between the S polarized-light and the P polarized-light of reflected light 281 is 158.9 degrees (21.1 degrees), and therefore it is necessary to provide a phase adjustment film 118c for reducing the phase difference to zero. Here, the phase adjustment film 118c is composed of a $TiO_2$ film having a predetermined film thickness. Other high-reflectance materials, such as Al, Cu and Au, similarly cause the relative phase difference to develop in the reflected light 281, and the phase adjustment film 118c for reducing the relative phase difference to substantially zero is provided, and a phase adjustment reflecting film 248 is formed by the reflecting film 118b and the phase adjustment film 118c. The phase adjustment reflecting film 248 is formed by a method as described above for the formation of the reflecting film 255 of the diffracting grating 107.

Figure 18:
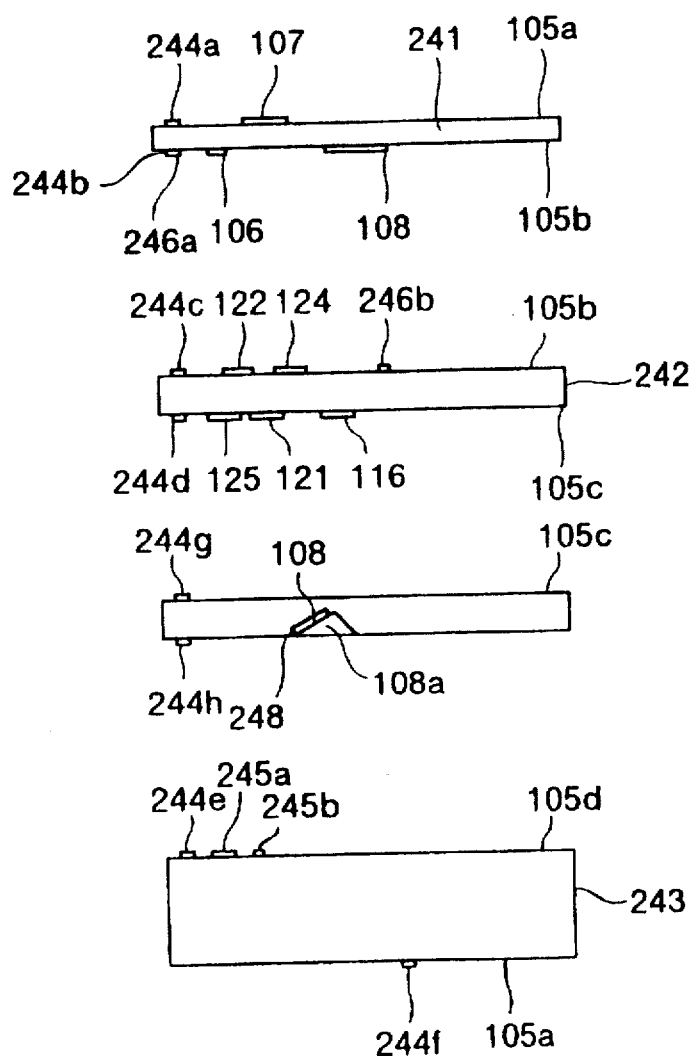
FIG. 18 is a side-elevational view showing plates of the optical pickup of the first embodiment before the plates are combined together into an assembly block.

Next, examples of the method of manufacturing the optical guide member 104 of the invention will be described with reference to FIGS. 18 to 22. FIG. 18 is a side-elevational view showing the plates before the assembly block of the optical pickup of the first embodiment is formed. By the above-mentioned optical function element-forming methods, the reflective-type diffraction grating 107, the first depth marker 246a and the first bonding position-registration marker 244a are formed on the first surface 105a of the first plate 241 of the first assembly block. The reflective-type diffusion angle conversion hologram 106, the first polarized beam splitter film 108 and the second bonding position-registration marker 244b are formed on the second surface 105b of the first plate 241. The reflecting film 122, the reflective-type astigmatism-generating hologram 124 and the third bonding position-registration marker 244c are formed on the first surface 105b of the second plate 242. The second polarization beam splitter film 116, the polarized light splitting film 121, the reflecting film 125, the fourth bonding position-registration marker 244d and the second depth marker 246b are formed on the second surface 105c of the second plate 242. The fifth bonding position-registration marker 244e, the first cutting marker 245a and the second cutting marker 245b are formed on the first surface 105d of the third plate 243. The sixth bonding position-registration marker 244f is formed on the second surface 105a of the third plate 243. The seventh bonding position-registration marker 244g is formed on the first surface 105c of the V-shaped groove plate 118, and the eighth bonding position-registration marker 244h is formed on the second surface 105d of the V-shaped groove plate 118, and the phase adjustment reflecting film 248 is formed on the V-shaped groove surface 108a.

Figure 19:
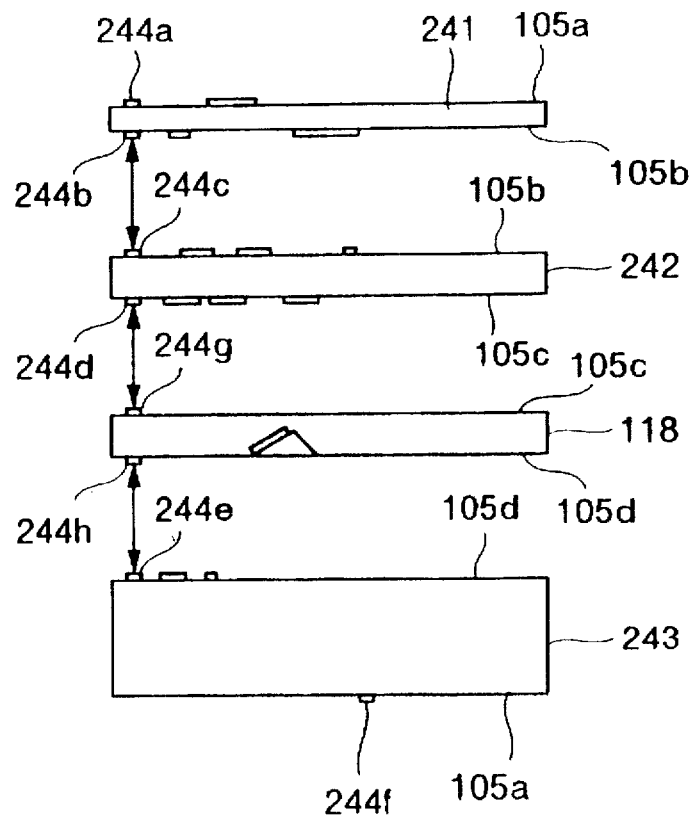
FIG. 19 is a view showing a method of forming the assembly block of the optical pickup of the first embodiment.
Figure 19:
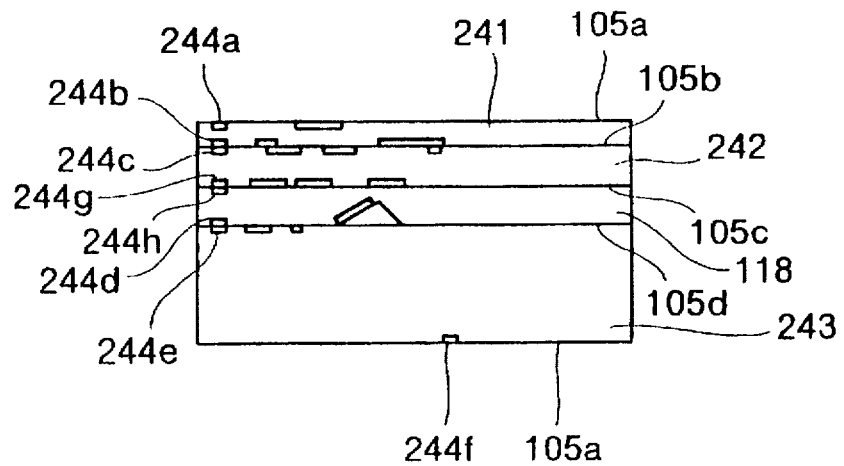

The method of forming the assembly block will be described with reference to FIG. 19. The first plate 241 and the second plate 242 are registered with each other, using the second and third bonding position-registration markers 244b and 244c, and then are bonded together. Similarly, the second plate 242, bonded to the first plate 241, and V-shaped groove plate 118 are registered with each other, using the fourth and fifth bonding position-registration markers 244d and 244e, and then are bonded together. Further, using the sixth bonding position-registration marker 244f, the third plate 243 is bonded to the V-shaped groove plate 118 bonded to the first and second plates 241 and 242, thereby forming the first assembly block. An adhesive used for bonding the plates is an epoxy resin having a refractive index very close to the refractive indexes of the first to third plates 241, 242 and 243 and the V-shaped groove plate 118. By thus using the adhesive resin with the refractive index very close to those of the first to third plates 241, 242 and 243 and the V-shaped groove plate 118, the relative phase difference between the S polarized-light and the P polarized-light is prevented from developing at the interface.

Figure 20A:
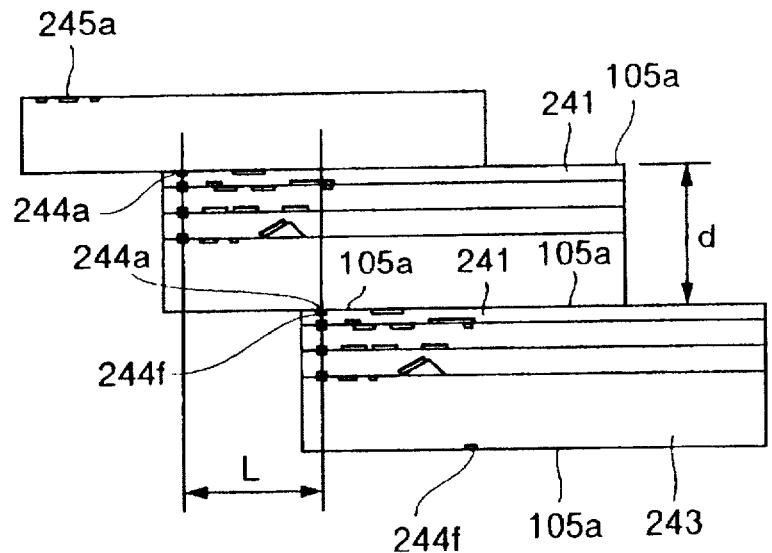
FIGS. 20a to 20c are views showing the formation of the assembly block of the optical pickup of the first embodiment.
Figure 20B:
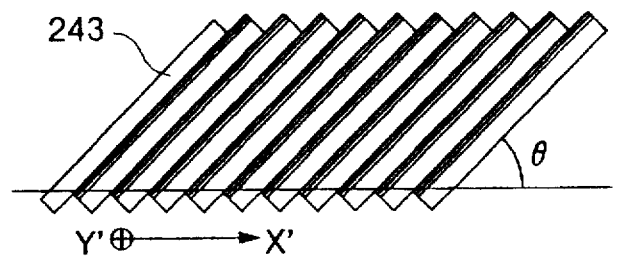
Figure 20C:
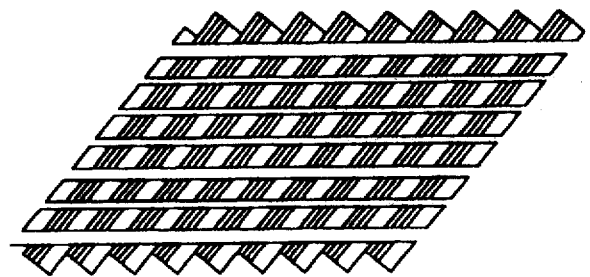

Next, a method of forming an assembly structure will be described with reference to FIGS. 20a to 20b. FIG. 20a is a view showing a method in which a plurality (n) of first assembly blocks mentioned above are prepared, and using the first bonding position-registration marker 244a of one assembly bock and the bonding position-registration marker 244f of another assembly block, the two assembly blocks are bonded together. In this manner, the plurality (n) of assembly blocks are bonded together. As a result, the optical function elements on the first surface 105a of the first plate 241 of the assembly block are held against the third plate 243 of the adjacent assembly block. The third plate 243 is bonded to the outermost (nth) assembly block, using the first bonding position-registration markers 244a of this assembly block and the bonding position-registration marker 244f of this third plate 243, thereby forming the assembly structure. FIG. 20b is a side-elevational view of the assembly structure.

A method of forming the planar block will be described with reference to FIGS. 20a to 21e. The assembly blocks of the assembly structure of FIG. 20b are bonded together in such a manner that they are offset by an amount L with respect to one another. The reason for this is that the planar block is formed into a common planar plate. The offset amount L is smaller than the thickness d of the assembly block, and is determined by the following formula:

L=d/tanθ

Figure 21A:
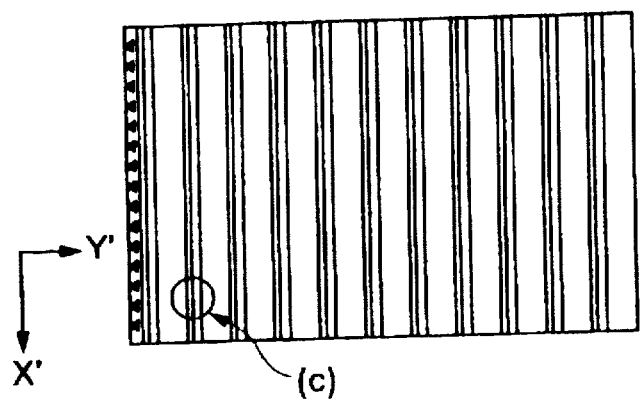
FIGS. 21a to 21e are views showing a method of forming a planar block in the optical pickup of the first embodiment.
Figure 21B:
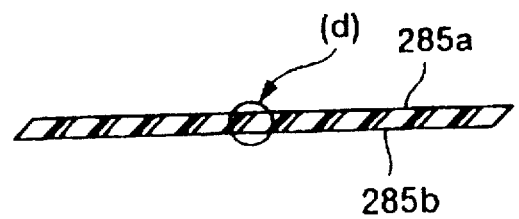
Figure 21C:
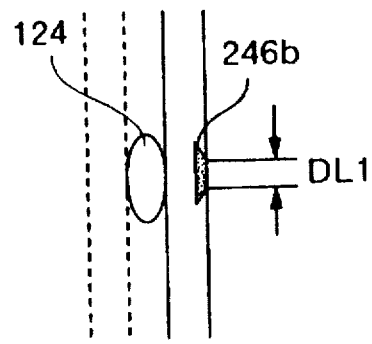
Figure 21D:
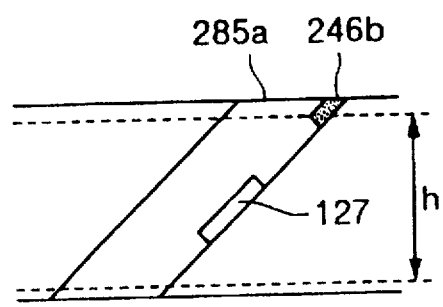
Figure 21E:
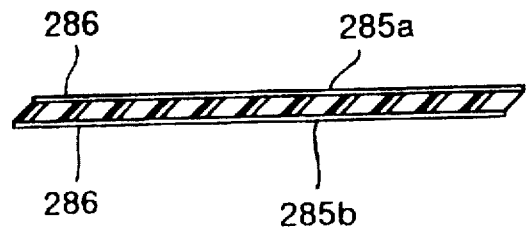

The inclination angle θ is the angle between the axis of the incident light and the bonding surfaces in the optical guide member of the invention, and is about 45° in this embodiment. A direction X' represents a direction inclined at the angle θ relative to the bonding surfaces, and the planar block is cut out from the assembly structure in a plane X'–Y'. The cutting is effected using the first cutting marker 245a, formed on the third plate 243 bonded to the outermost assembly block, as a reference. FIG. 21a is a front-elevational view of the planar block cut from the assembly structure, and FIG. 21b is a side-elevational view thereof. The optical function elements packaged in the assembly blocks are arranged in the direction X', and the plurality of optical guide members of the invention are arranged in the planar block. FIG. 21c is an enlarged view of a portion (c) in FIG. 21a, and FIG. 21 is an enlarged view of a portion (d) in FIG. 21b. The second depth marker 246b is exposed to a first surface 285a of the planar block when the planar block is cut from the assembly structure. The second depth marker 246b serves to control the distance between the reflective-type astigmatism-generating hologram 124 and the first surface 285a of the planar block, and the first surface 285a is processed or worked until a depth marker value DL reaches a predetermined value. Then, using the first surface 285a as a reference, a second surface 285b is processed or worked until a predetermined device height h of the optical guide member of the invention is obtained. After the first and second surfaces 285a and 285b are thus worked, a anti-reflection film 286 for the design central wavelength λ0 is formed on each of the first and second surfaces 285a and 285b. The anti-reflection film 286 is composed of a dielectric material. Here, a hard coating of TiO$_2$/SiO$_2$ is formed as the anti-reflection film 286 so that the film will not be damaged at a later grinding step. The anti-reflection film 286 is formed by a vacuum film-forming device.

Figure 22A:
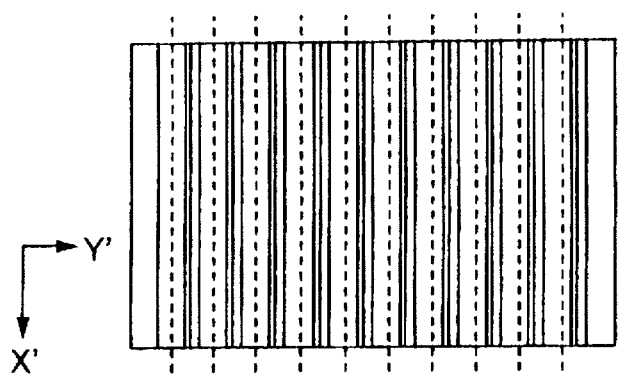
FIGS. 22a to 22d are views showing a method of forming a bar block, as well as a final cutting process, in the optical pickup of the first embodiment.
Figure 22B:
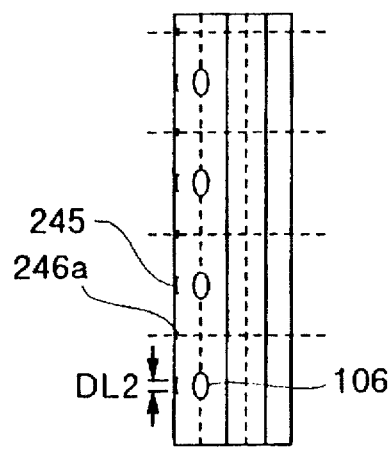
Figure 22C:
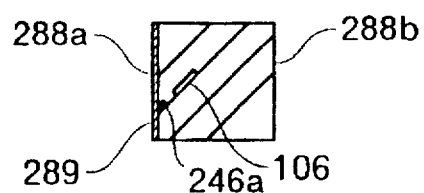

Next, the process of forming the bar blocks cut from the planar block will be described with reference to FIGS. 22a to 22d. FIG. 22a shows a front-elevational view of the planar block, showing a method in which the planar block is cut in a Y-axis direction to form the bar blocks. FIGS. 22b and 22c are a front-elevational view and a side-elevational view of the bar block, respectively. The first depth marker 246a is exposed to a first surface 288a of the bar block when the bar block is cut from the planar block. The first depth marker 246a serves to control the distance between the reflective-type diffusion angle conversion element 106 and the first surface 288a of the bar block, and the first surface 288a is processed or worked until a depth marker value DL2 reaches a predetermined value. Then, using the first surface 288a as a reference, a second surface 288b is processed or worked until a predetermined device length L of the optical guide member of the invention is obtained. After the first and second surfaces are thus worked, a anti-reflection film 289 for the design central wavelength λ0 is formed on the first surface 288a. The anti-reflection film 289 is composed of a dielectric film. Here, a hard coating of TiO$_2$/SiO$_2$ is formed as the anti-reflection film 289 so that the film will not be damaged at the later grinding step. The anti-reflection film 289 is formed by a vacuum evaporation method.

Figure 22D:
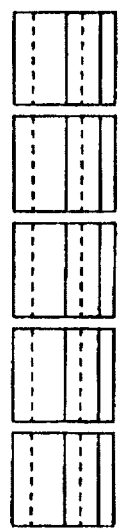

Using the first cutting markers 245 as a reference, the bar block is cut to provide the optical guide members 104 of the invention. FIG. 22d shows the chip obtained by cutting.

Figure 23:
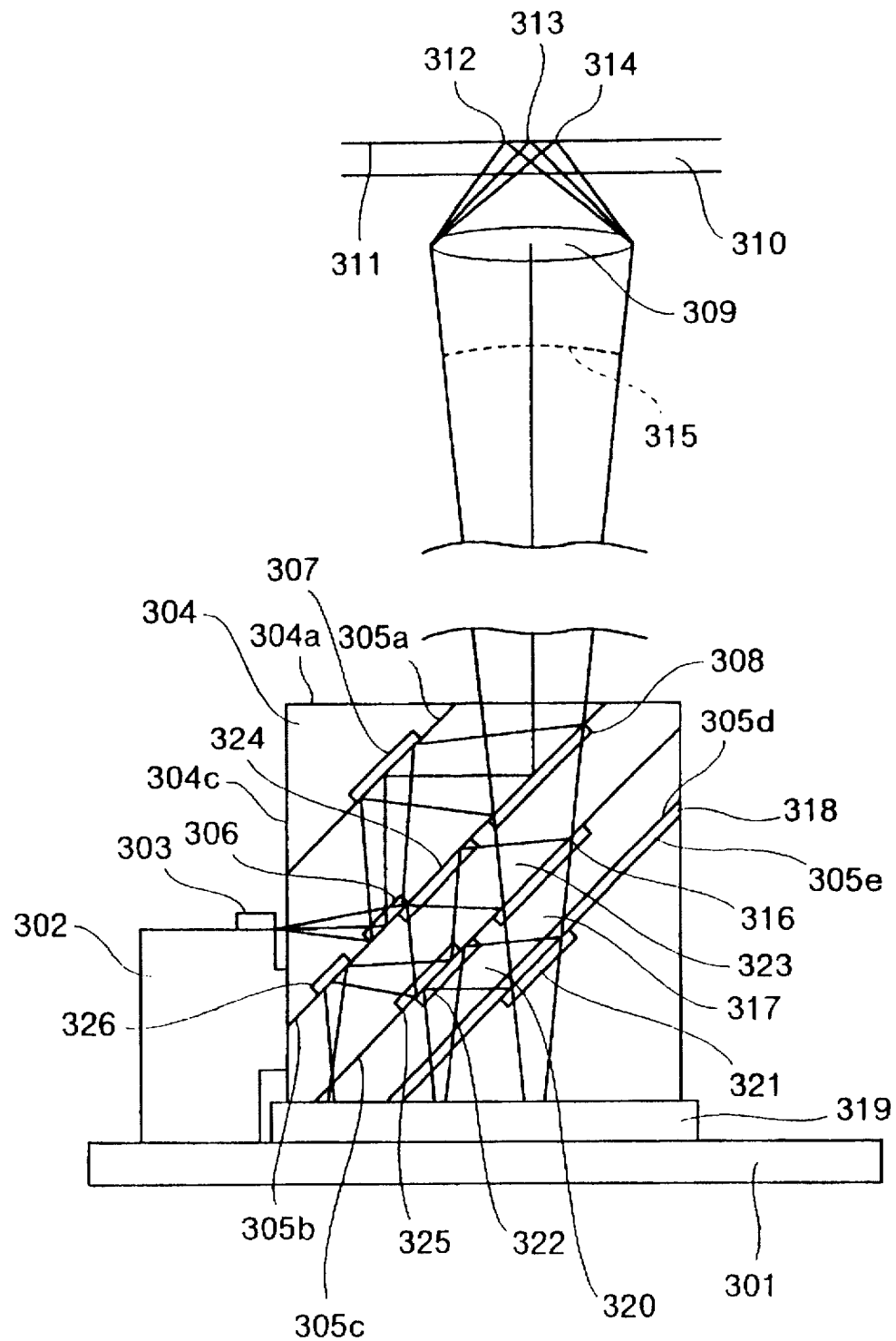
FIG. 23 is a side-elevational view of a second embodiment of an optical pickup of the invention.
Figure 24:
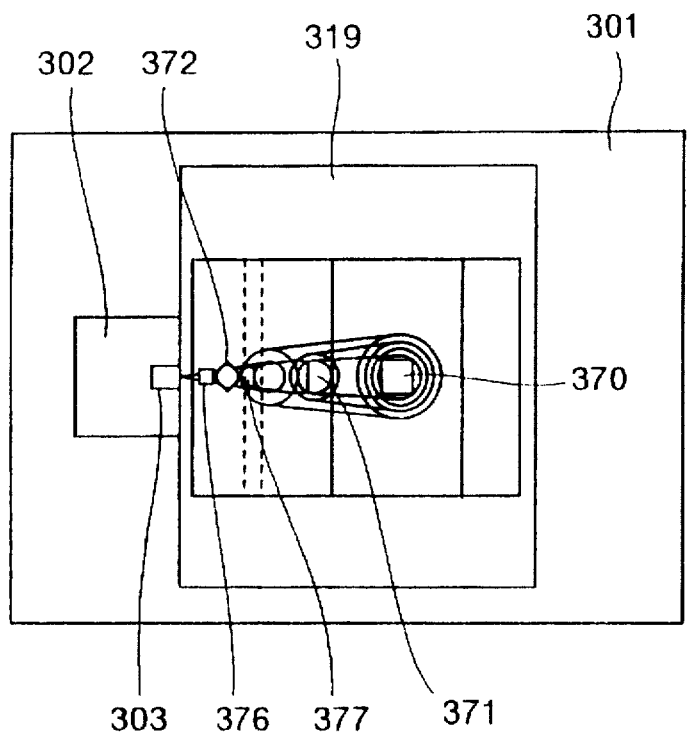
FIG. 24 is a plan view of the optical pickup of the second embodiment.

A second embodiment of the present invention will now be described with reference to the drawings. FIG. 23 is a side-elevational view of the second embodiment of an optical pickup of the invention, and FIG. 24 is a plan view of this optical pickup.

In the optical pickup of this embodiment, a base plate 301, a sub-mount 302, a semiconductor laser chip 303, a diffusion angle conversion hologram 306, a diffraction grating 307, an objective lens 309, a first beam splitter film 308, a second beam splitter film 316, a sensor base plate 319 and so on are arranged in the same manner as described in the first embodiment, but this second embodiment differs from the first embodiment in that instead of the V-shaped groove plate used in the first embodiment, a half wave plate 318 is formed on a fourth inclined surface 305d parallel to first, second and third inclined surfaces.

Figure 25:
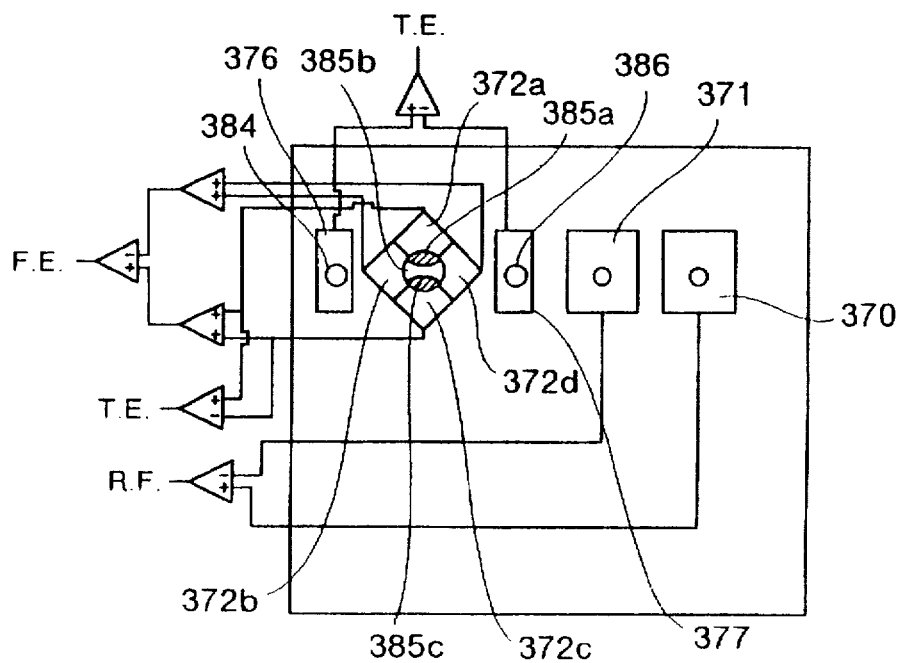
FIG. 25 is a view showing the arrangement of light-receiving sensors and a signal processing circuit in the optical pickup of the second embodiment.

In this embodiment, an optical path from the semiconductor laser chip 303 to an optical disk 310, as well as an optical path from the optical disk 310 to the second beam splitter film 316, is the same as that in the first embodiment. FIG. 25 is a view explanatory of the arrangement of light-receiving sensors and a signal processing circuit in the second embodiment of the invention. Transmitted light 317 from the second beam splitter film 316 is incident on the half wave plate 318 formed on the fourth inclined surface 305d. The polarization plane of the transmitted light 317 is turned through 45° by the half wave plate 318, and is incident on a polarized light splitting film 321 (formed on a fifth inclined surface 305e parallel to the first to fourth inclined surfaces) as linearly-polarized light at an angle of 45° relative to the incident surface of this film 321, so that a P polarization component of the linearly-polarized light transmits through the polarized light splitting film 321 whereas a S polarization component thereof is reflected by the polarized light splitting film 321. The P polarization component, transmitted through the polarized light splitting film 321, reaches a light receiving sensor 370. On the other hand, the S polarization component, reflected by the polarized light splitting film 321, is reflected by a reflecting film 327 on the third inclined surface 305c, and after transmitting through the half wave plate 318, reaches a light-receiving sensor 371.

Figure 26:
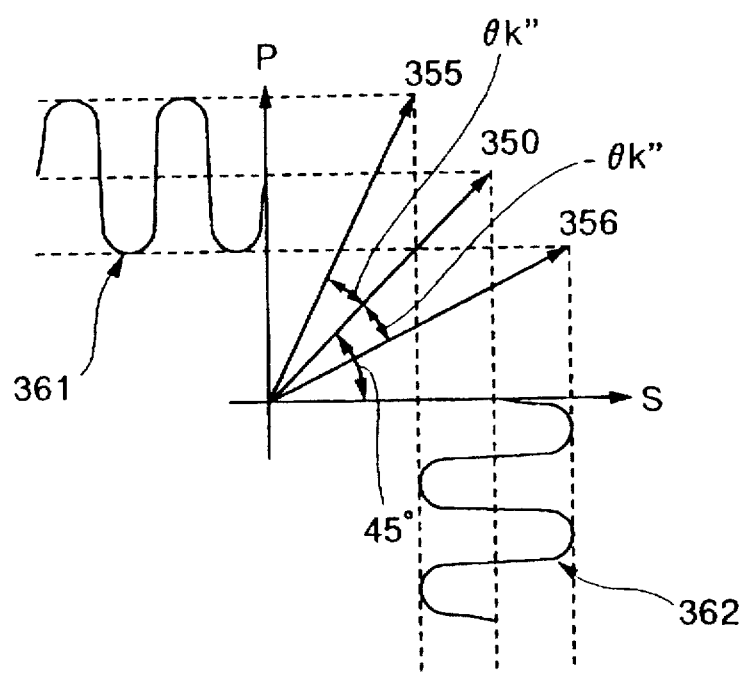
FIG. 26 is an illustration showing a condition of polarization in a polarized light splitting film in the optical pickup of the second embodiment.

FIG. 26 is a view explanatory of the condition of polarization in the polarized light splitting film 321 of the second embodiment. In FIG. 26, arrow 350 represents the direction of polarization of the linearly-polarized light incident on the polarized light splitting film 321 when any information is not recorded in an information recording surface 311 of the optical disk 310. The light beam incident on the polarized light splitting film 321 has already been increased in Kerr rotation angle from θk to θk' by the first and second beam splitter films 308 and 316 as in the first embodiment, and in accordance with the direction of the magnetization of the optical disk 310, the polarized direction is modulated from linearly-polarized light 355 to linearly-polarized light 356. Therefore, by finding the differential between a signal, detected by the light-receiving sensor 370, and a signal detected by the light-receiving sensor 371, an opto-magnetic reproduction signal is obtained from the following formula as in the first embodiment:

$$R.F.=I370-I371$$

Reflected light 320 from the second beam splitter film 316 is guided to an astigmatism-generating hologram 324 in the same path as in the first embodiment, and produces astigmatism, is further reflected by reflecting films 325 and 326, and reaches a light-receiving sensor 372 and light-receiving sensors 376 and 377. A focus error signal is obtained by an astigmatism method as in the first embodiment. More specifically, if photoelectric currents, outputted respectively from light-receiving sensors 372a, 372b, 372c and 372d, are represented by I372a, I372b, I372c and I372d, respectively, the focus error signal is expressed by the following formula as will be appreciated from the circuit diagram of FIG. 25:

$$F.E.=(I372a+I372c)-(I372b+I372d)$$

A tracking error signal is obtained by a 3-beam method or a push-pull method as in the first embodiment. If photoelectric currents, outputted respectively from the light-receiving sensors 376 and 377, are represented by I376 and I377, respectively, the tracking error signal is obtained by the 3-beam method as will be appreciated from the circuit diagram of FIG. 25. Also, the tracking error signal can be obtained by the push-pull method, using the light-receiving sensors I372a, I372b, I372c and I372d as indicated in formula (11) given below.

In this embodiment, although reflective-type holograms are used as the diffusion angle conversion hologram 306 and the astigmatism-generating hologram 324, respectively, lens of the reflective type or the like which perform similar functions can be used instead of the holograms.

In this embodiment, although the focus error signal is obtained by the astigmatism method using the astigmatism-generating hologram 324, there can be used, instead of the astigmatism-generating hologram 324, a reflective-type hologram or a reflective-type lens having one or more patterns by which reflected light 328 from the second beam splitter film 316 is caused to form an image on the sensor base plate 319, thereby obtaining the focus error signal by a knife-edge method or a Foucault method.

In this second embodiment, for forming an optical guide member 304, three parallel flat plates and a quartz plate are bonded together through adhesive layers to form an assembly block. Then, the assembly blocks are bonded together through adhesive layers to form a composite block. Then, the composite block is cut obliquely with respect to the bonding surfaces of the blocks to provide planar blocks. Then, the optical guide members (minimum-unit blocks) 304 are cut from the planar block as a minimum constitutional element.

In this embodiment, the light, emitted from the semiconductor laser chip 303, is reflected once by the diffusion angle conversion hologram 306 formed on the second inclined surface 305b, and is further reflected once by the diffraction grating 307 formed on the first inclined surface 305a. Thus, this emitted light is reflected twice, and then is guided to the first beam splitter film 308. However, this emitted light may be reflected a plurality of times by the first inclined surface 305a and the second inclined surface 305b. In such a case, the diffusion angle conversion hologram and the diffraction grating 107 may be formed on either of the first and second inclined surfaces.

In this embodiment, the astigmatism-generating hologram 124 may be formed at either of the positions of the reflecting films 325 and 326, in which case similar effects can be achieved, and the servo signals can be obtained. Furthermore, the use of the reflecting film 325 or the reflecting film 326 may be omitted, in which case the light can transmit through the third inclined surface 305c, and is guided to the light-receiving sensor 372, 376 or 377.

In this embodiment, although the S polarization component, reflected by the polarized light splitting film 321, is further reflected by the reflecting film 325 on the third inclined surface 305c, so that the light is guided to the light-receiving sensor, the provision of the reflecting film 325 may be omitted, in which case another reflecting film is formed on the second inclined surface 305b, and the S polarization component is reflected by this reflecting film to be guided to the light-receiving sensor 371.

Figure 27:
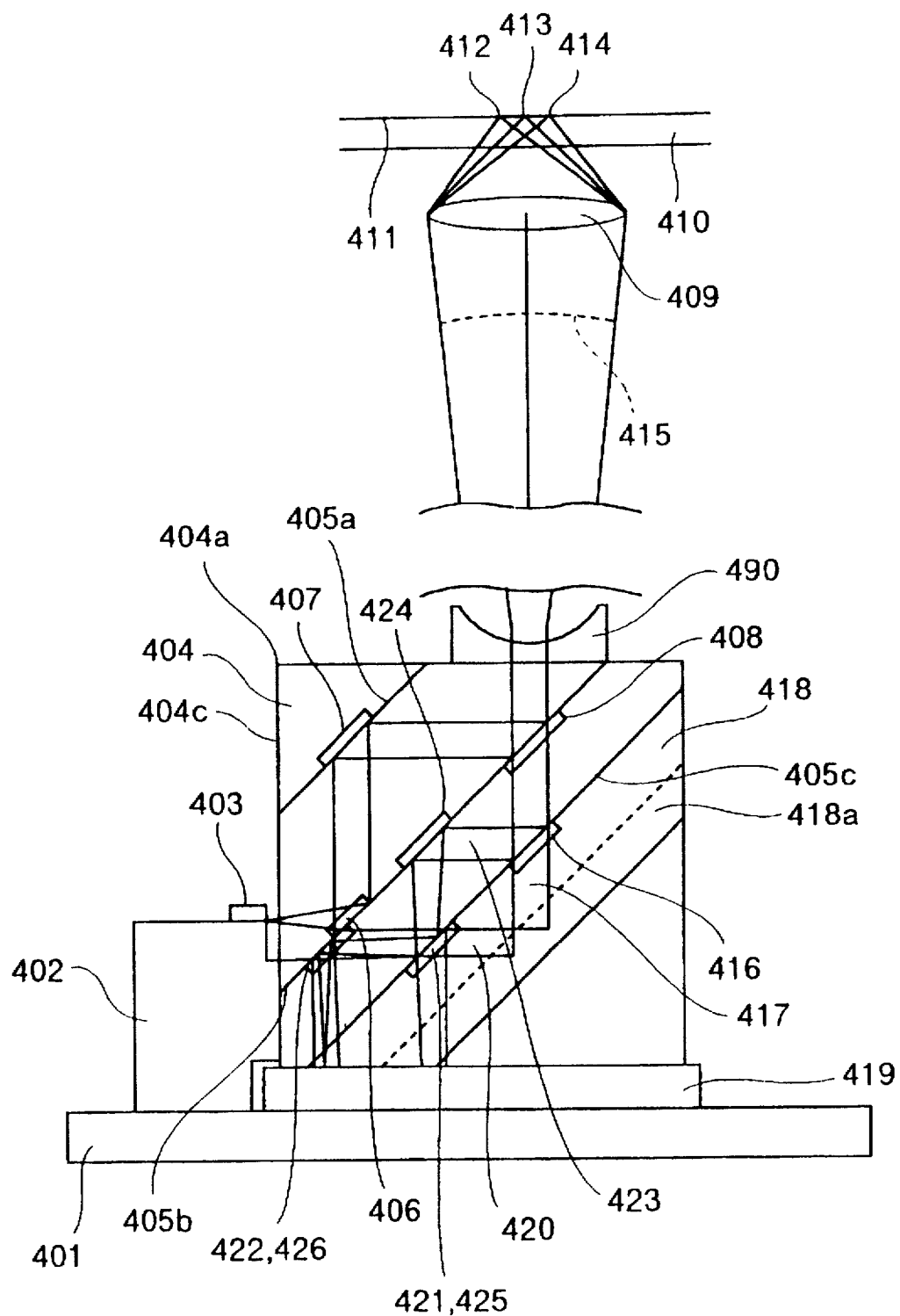
FIG. 27 is a side-elevational view of a third embodiment of an optical pickup of the invention.
Figure 28:
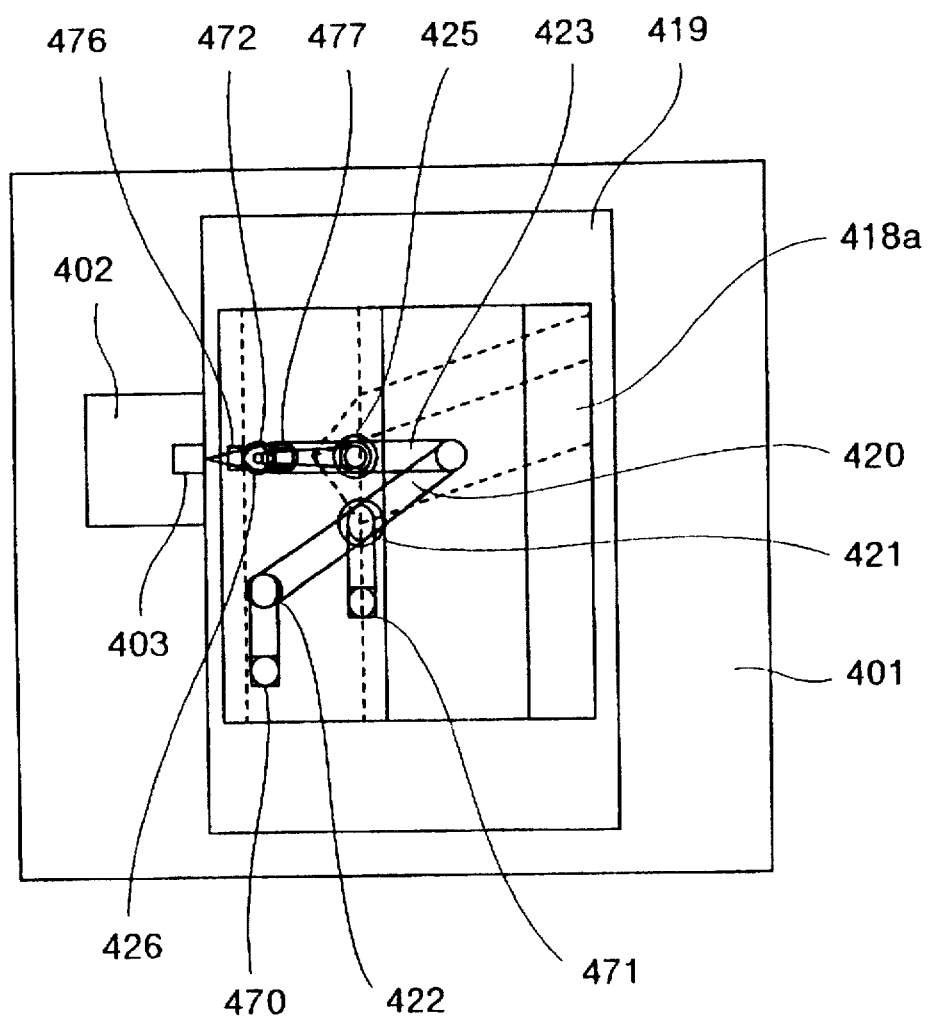
FIG. 28 is a plan view of the optical pickup of the third embodiment.

A third embodiment of the present invention will now be described with reference to the drawings. FIG. 27 is a side-elevational view of the third embodiment of an optical pickup of the invention, and FIG. 28 is a plan view of this optical pickup.

In the optical pickup of this embodiment, a base plate 401, a sub-mount 402, a semiconductor laser chip 403, an optical guide member 404 having a plurality of parallel inclined surfaces, a diffraction grating 407, an objective lens 409, a first beam splitter film 408, a second beam splitter film 416, a V-shaped groove plate 418, a polarized light splitting film 421, a sensor base plate 419, light-receiving sensors 470, 471, 472, 476 and 477, and so on are arranged in a similar manner as described in the first embodiment.

A laser beam, emitted horizontally from the semiconductor laser chip 403 mounted horizontally on the base plate 401 through the sub-mount 402, is incident on a side surface 404c of the optical guide member 404 having the plurality of parallel inclined surfaces, and enter the optical guide member 404. Then, this emitted laser beam is incident on a diffusion angle conversion hologram 406 formed on the second inclined surface 405b of the optical guide member 404, and is converted into parallel light rays, while corrected in phase. The light beam, converted into generally parallel rays and reflected by the diffusion angle conversion hologram 406, is divided by the reflective-type diffraction grating 407 (formed on the first inclined surface 405a) into zero-order diffraction light (hereinafter referred to as "main beam") and ±first order diffraction light (hereinafter referred to as side beam), and is reflected by it. The reflected light from the diffraction grating 407 is incident on the first beam splitter film 408. Reflected light from the first beam splitter film 408 is incident on a flat concave lens 490 bonded to an upper surface 404a of the optical guide member 404. The light beam incident on the flat concave lens 490 is again converted into diffused light, and then is incident on the objective lens 409, and forms an image on an optical disk 410. At this time, the light, to be transmitted through the flat concave lens 490 and to be incident on the objective lens 409, is corrected in phase by the diffusion angle conversion hologram 406 so as to have an ideal spherical wave 415, as in the first embodiment. Reflected light from the optical disk 410 again transmits through the objective lens 409, and transmits through the flat concave lens 409, and is converted into generally parallel ray light by the flat concave lens 490. Along similar paths as described above for the first embodiment, a P polarization component of the light (parallel rays), transmitted through the flat concave lens 490, is guided to the first light-receiving sensor 470 while a S polarization component thereof is guided to the second light-receiving sensor 471, and an opto-magnetic signal is obtained from a differential signal thereof.

Servo signals are detected by guiding the return light (generally parallel rays) from the optical disk 410 to an astigmatism detection hologram 424 along similar paths as described above for the first embodiment. A focus error signal is detected by an astigmatism method as in the first embodiment. A tracking error signal is detected by a 3-beam method or a push-pull method as in the first embodiment.

In this embodiment as in the first and second embodiment, there can be used, instead of the astigmatism-generating hologram 424, a reflective-type hologram or a reflective-type lens having one or more patterns by which reflected light 428 from the first beam splitter film 408 is caused to form an image on the sensor base plate 419, thereby obtaining the focus error signal by a knife-edge method or a Foucault method.

Figure 29:
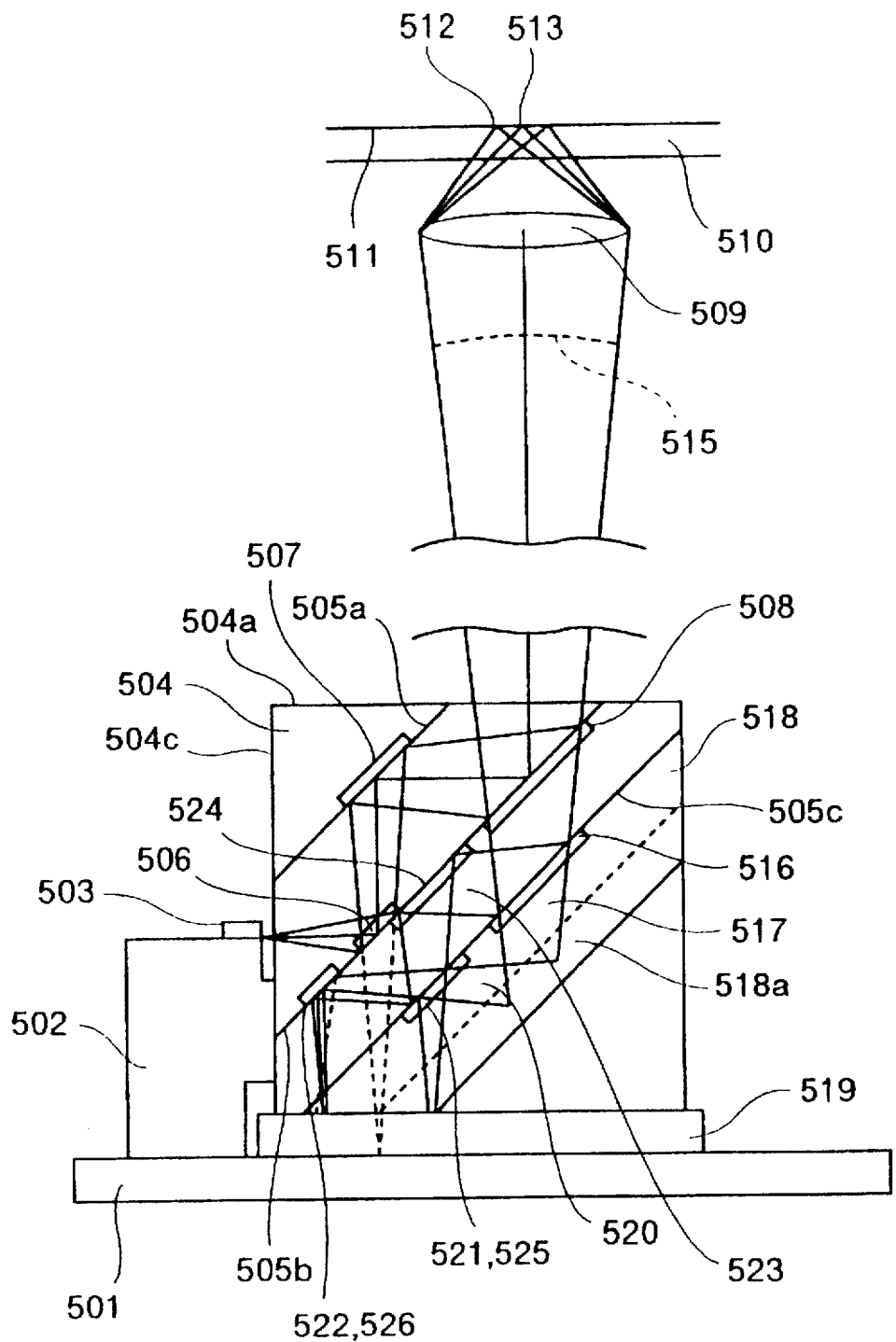
FIG. 29 is a side-elevational view of a fourth embodiment of an optical pickup of the invention.
Figure 30:
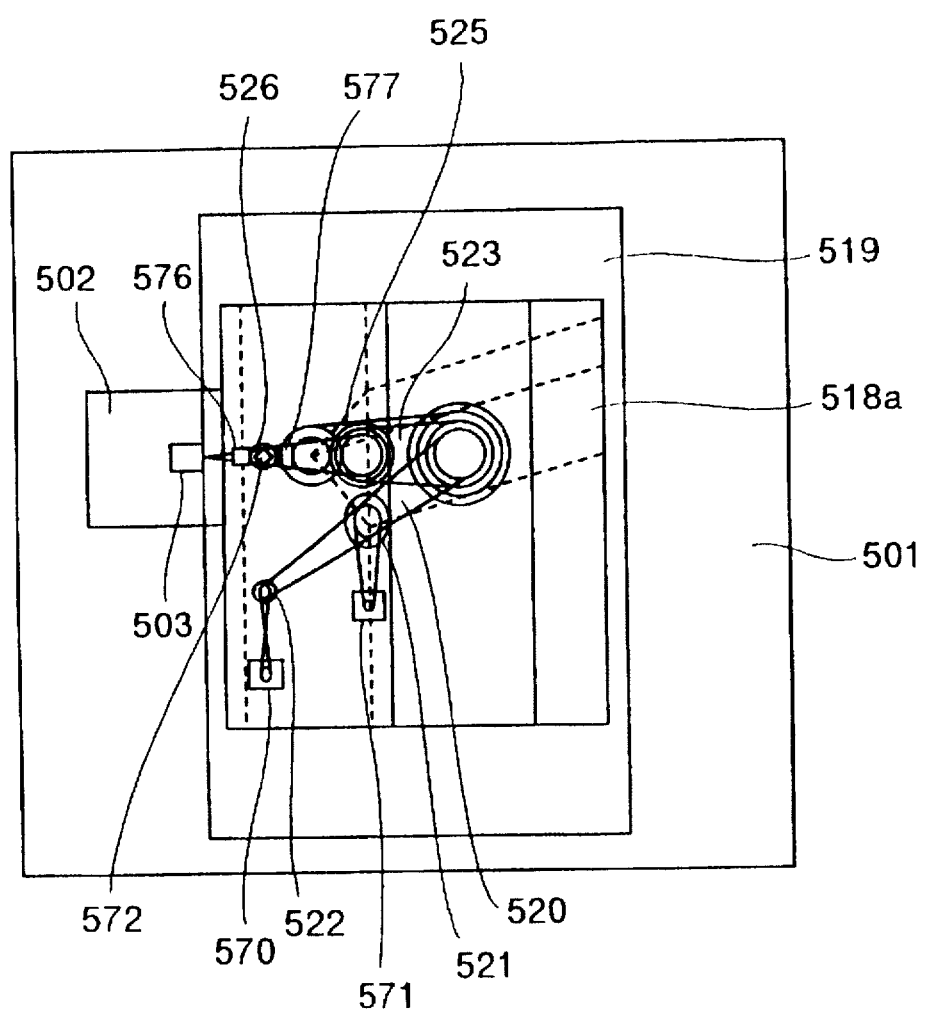
FIG. 30 is a plan view of the optical pickup of the fourth embodiment.

A fourth embodiment of the present invention will now be described with reference to the drawings. FIG. 29 is a side-elevational view of the fourth embodiment of an optical pickup of the invention, and FIG. 30 is a plan view of this optical pickup.

In the optical pickup of this embodiment, a base plate 501, a sub-mount 502, a semiconductor laser chip 503, an optical guide member 504 having a plurality of parallel inclined surfaces, a diffraction grating 407, an objective lens 509, a first beam splitter film 508, a second beam splitter film 516, V-shaped groove plate 518, a polarized light splitting film 521, a sensor base plate 519, an astigmatism-generating hologram 524, light-receiving sensors 570, 571, 572, 576 and 577, and so on are arranged in a similar manner as described in the first embodiment.

A laser beam, emitted horizontally from the semiconductor laser chip 503 mounted horizontally on the base plate 501 through the sub-mount 502, is incident on a side surface 504c of the optical guide member 504 having the plurality of parallel inclined surfaces, and enters this optical guide member 504. Then, this emitted laser beam is incident on a first diffusion angle conversion hologram 506 formed on the second inclined surface 505b of the optical guide member 504. Here, a direction parallel to the direction of oscillation of the emitted light from the semiconductor laser chip 503 is represented by an x-direction, and a direction perpendicular to this oscillation direction is represented by a y-direction. With respect to a diffusion angle of that light beam of the emitted light (emitted from the semiconductor laser chip 503) that can be incident on the first diffusion angle conversion hologram 506, the first diffusion angle conversion hologram 506 can convert an x-direction diffusion angle and a y-direction diffusion angle thereof at different conversion rates, respectively (hereinafter referred to as "to convert the diffusion angle"). The light, which has been incident on the first diffusion angle conversion hologram (reflective-type hologram) 506, so that the x-direction diffusion angle and the y-direction diffusion angle have been converted at different conversion rates, respectively, is incident on a second diffusion angle conversion hologram (reflective-type hologram) 507, and is reflected by it in such a manner that x-direction and y-direction diffusion angles are converted at different conversion rates, respectively. The light, which has been converted in diffusion angle and reflected by the second diffusion angle conversion hologram 507, is incident on the first beam splitter film 508. The light, reflected by the first beam splitter film 508, goes out of the optical guide member 504 through an upper surface 504a thereof, and is incident on the objective lens 509. The light to be incident on the objective lens 509 has been subjected to beam rectification by the first and second diffusion angle holograms so as to have an ideal spherical wave.

Figure 31A:
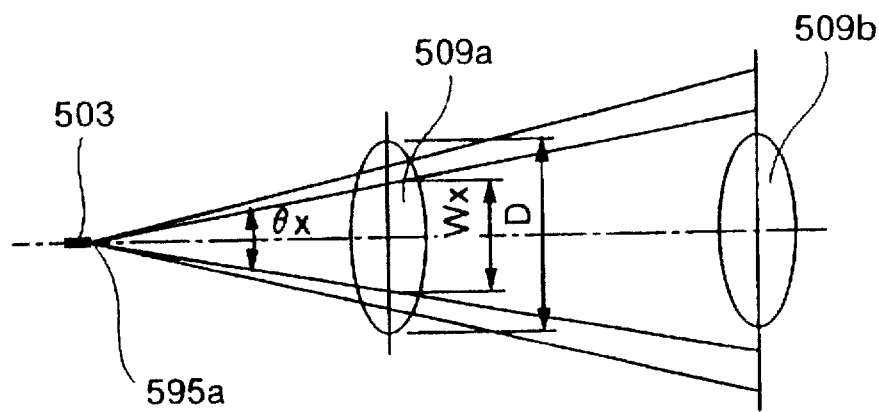
FIGS. 31a and 31b are cross-sectional views of a beam in an x-direction and a y-direction, respectively, without first and second diffusion angle conversion holograms in the optical pickup of the fourth embodiment.
Figure 31B:
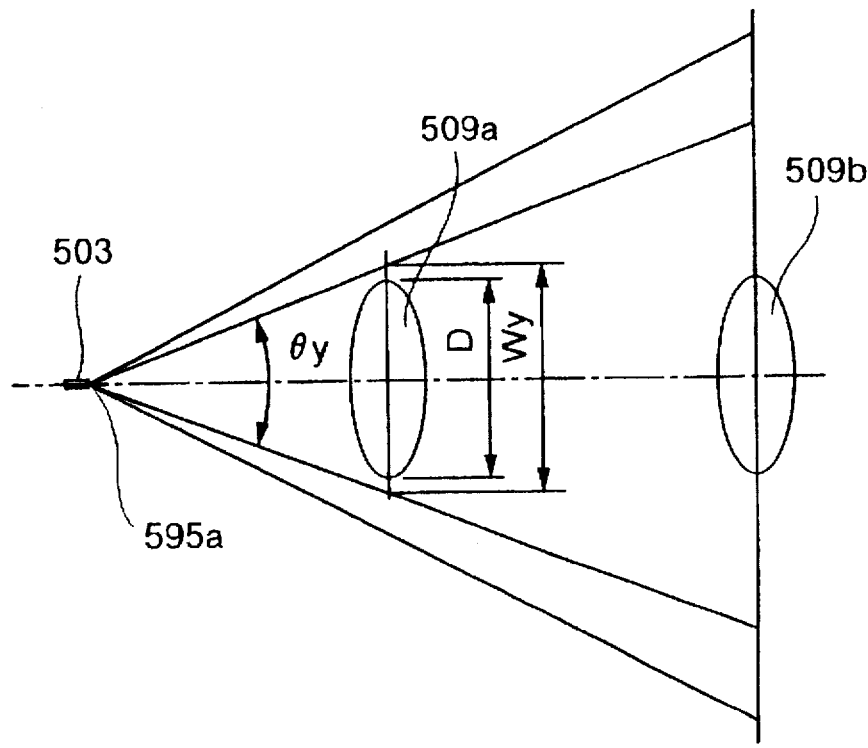
Figure 32A:
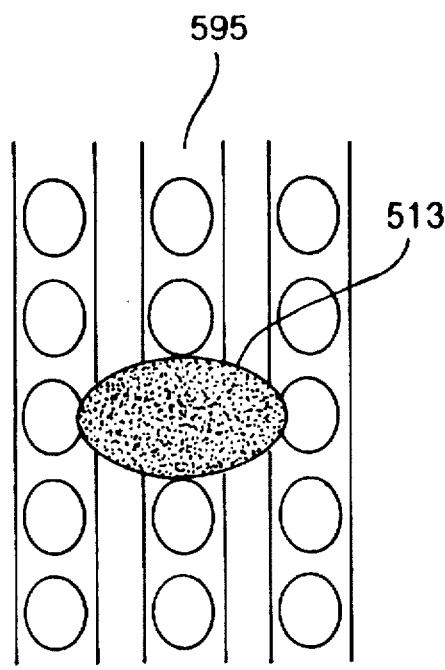
FIGS. 32a and 32b are views showing an image spot on an optical disk without the first and second diffusion angle conversion holograms in the optical pickup of the fourth embodiment.
Figure 32B:
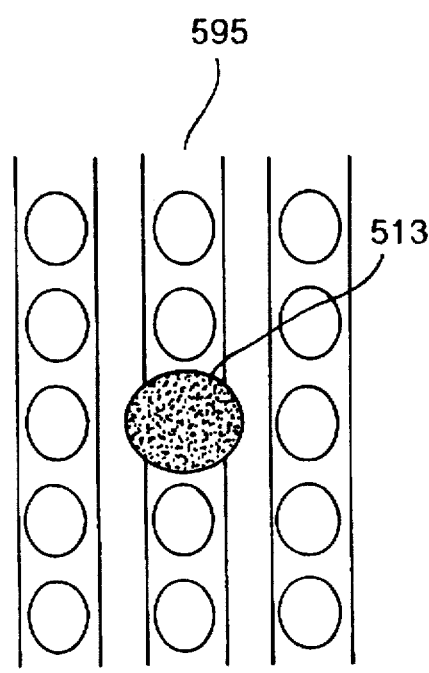
Figure 33A:
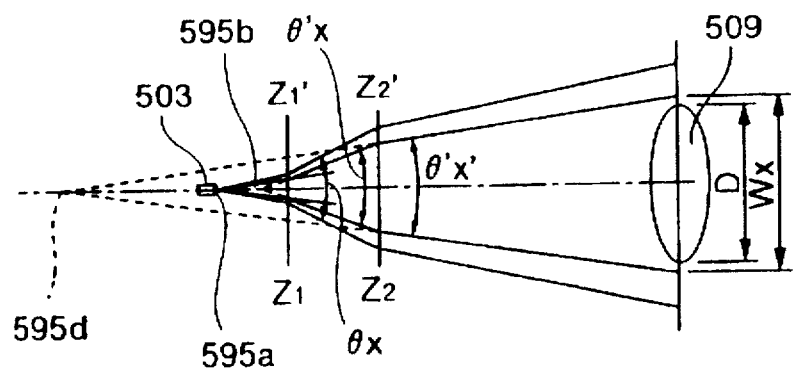
FIGS. 33a and 33b are cross-sectional views of a beam in an x-direction and a y-direction, respectively, with the first and second diffusion angle conversion holograms in the optical pickup of the fourth embodiment.
Figure 33B:
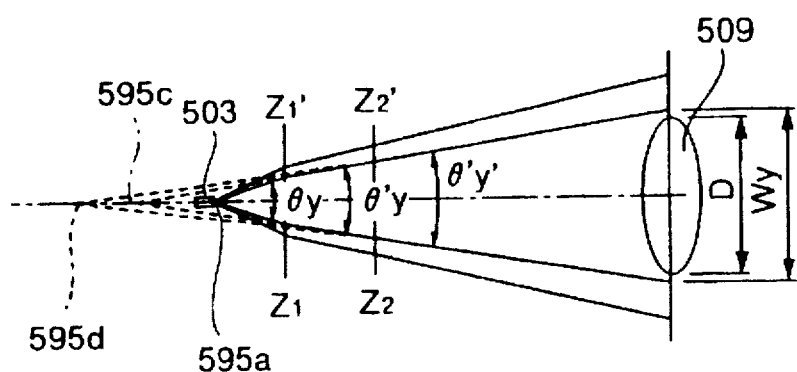
Figure 34:
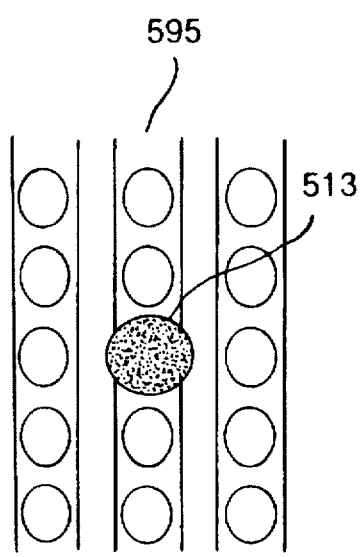
FIG. 34 is a view showing an image spot on the optical disk with the first and second diffusion angle conversion holograms in the optical pickup of the fourth embodiment.
Figure 35A:
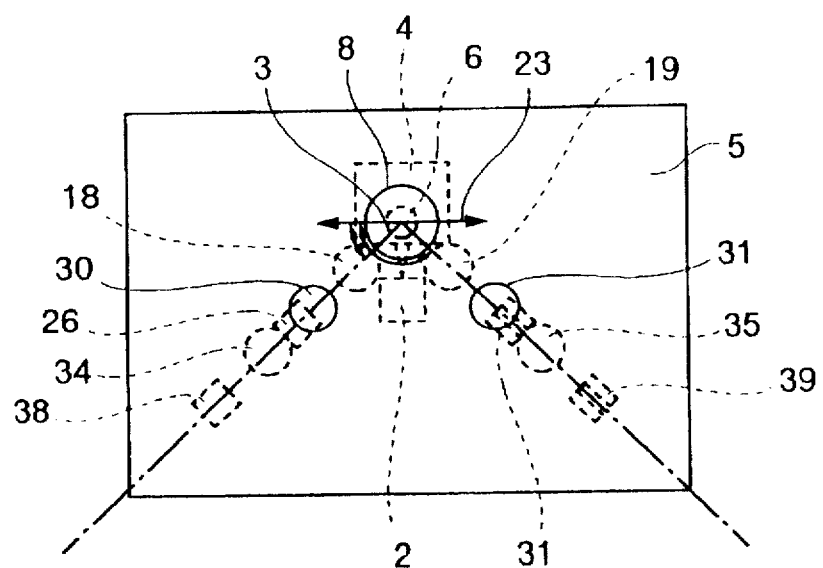
FIGS. 35a and 35b are views showing a conventional optical pickup.
Figure 35B:
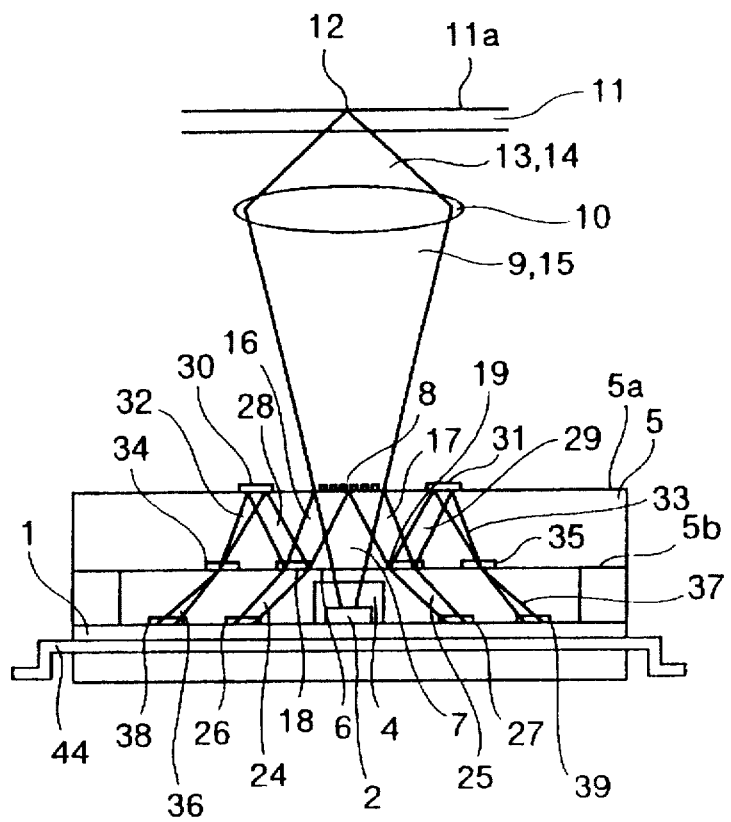
Figure 36:
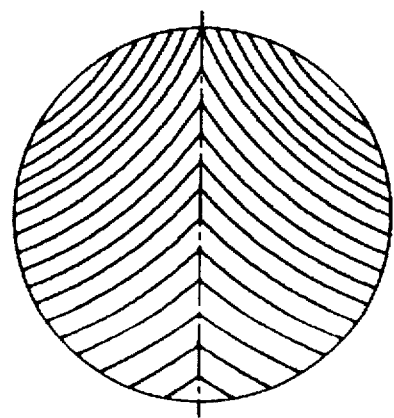
FIG. 36 is a view showing a pattern of a conventional hologram.
Figure 37:
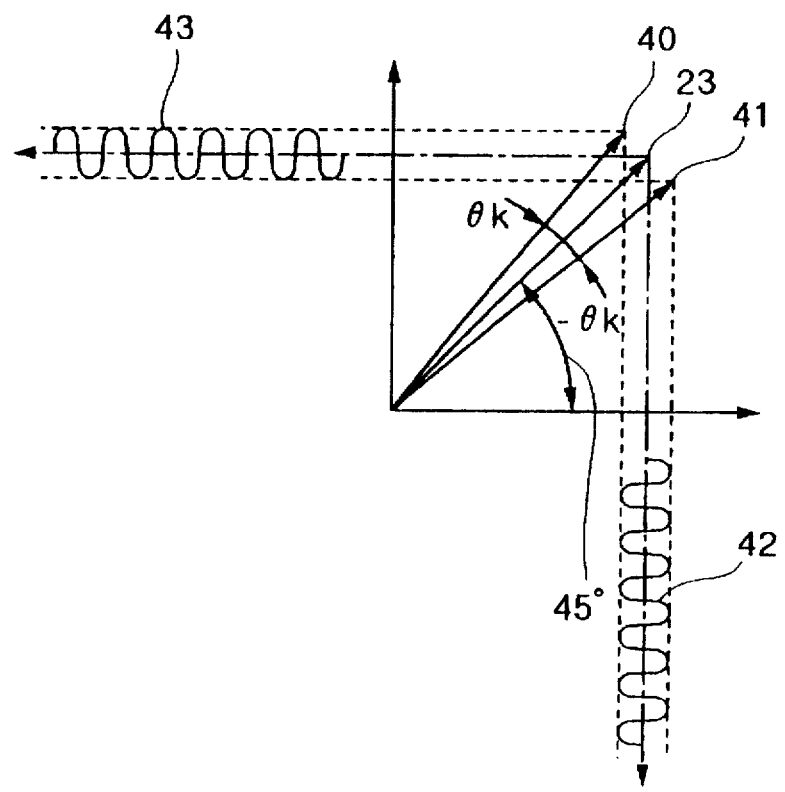
FIG. 37 is an illustration showing a condition of polarization in a conventional polarized light splitting film.
Figure 38:
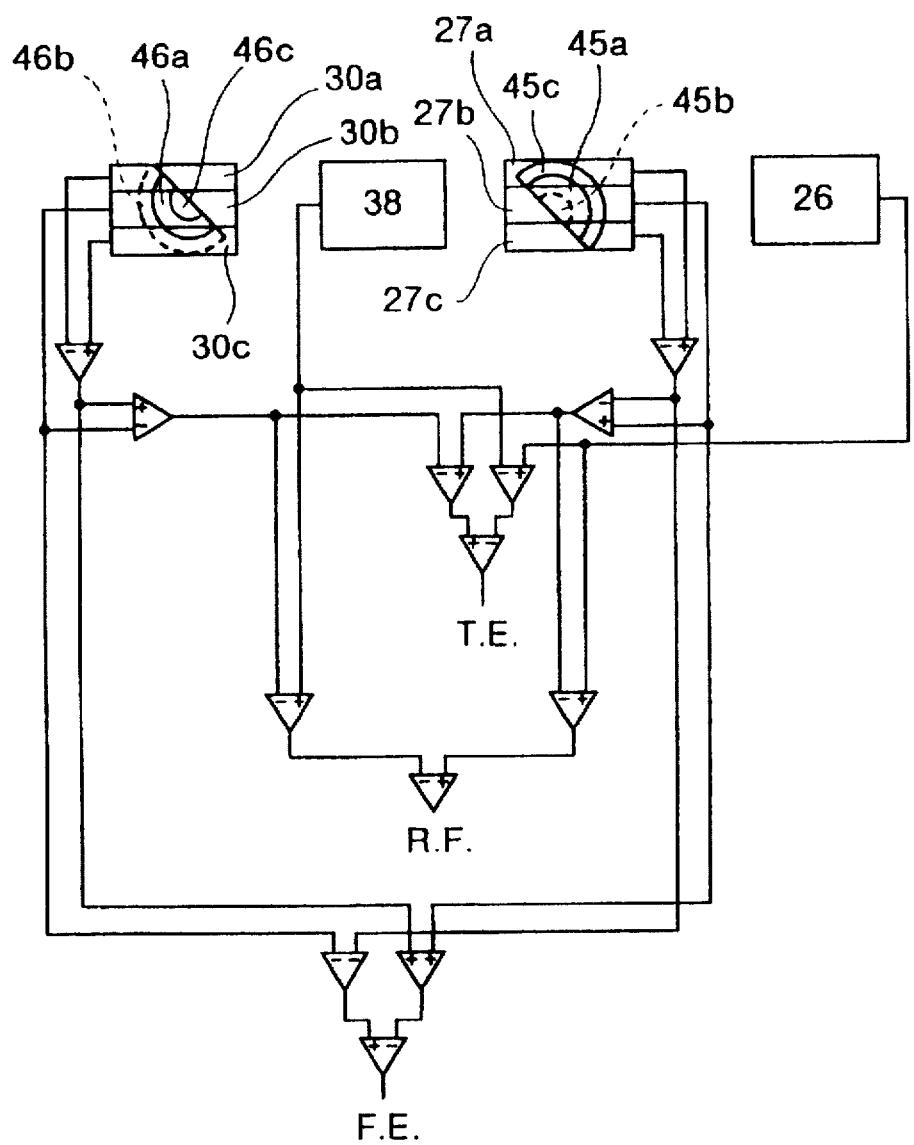
FIG. 38 is a view showing a conventional signal processing circuit.

The principle of the beam rectification by the first and second diffusion angle conversion holograms will now be described in detail with reference to FIGS. 31 to 34. FIG. 31a is a cross-sectional view of the beam in the x-direction without the first and second diffusion angle conversion holograms. FIG. 31b is a cross-sectional view of the beam in the y-direction without the first and second diffusion angle conversion holograms. FIG. 32a shows an image spot on an optical disk 510 without the first and second diffusion angle conversion holograms when the objective lens 509 is disposed at a position 509a. FIG. 32b shows an image spot on the optical disk 510 without the first and second diffusion angle conversion holograms when the objective lens 509 is disposed at a position 509b. FIG. 33a is a cross-sectional view of the beam in the x-direction with the first and second diffusion angle conversion holograms. FIG. 33b is a cross-sectional view of the beam in the y-direction with the first and second diffusion angle conversion holograms. FIG. 34 shows an image spot on the optical disk 510 with the first and second diffusion angle conversion holograms. Actually, although the simple cross-sectional shapes shown in FIGS. 31a, 31b, 33a and 33b are not obtained since the light is reflected by the inclined surfaces 505a and 505b and so on, these are shown in a simplified manner for illustration purposes. In FIGS. 33a and 33b, for convenience, a plane Z1–Z1' indicates the position where the first diffusion angle conversion hologram 506 exists, and a plane Z2–Z2' indicates the position where the second diffusion angle conversion hologram 507 exists. When the first and second diffusion angle conversion holograms are not provided, the objective lens 509 disposed at the position 509a as shown in FIGS. 31a and 31b, the image spot 513 is enlarged relative to a row 595 of pits in a direction perpendicular to the direction of the track, so that the light spot falls on the adjacent pit rows, as shown in FIG. 32a. As a result, the adjacent pit information is included, so that the C/N ratio of the opto-magnetic reproduction signal is degraded. This occurs since the overall half-width Wx of the light (incident on the objective lens 509) in the x-direction is about ½ of the effective diameter D of the objective lens 509. When the objective lens 509 is disposed at the position 509b, the overall half-width Wx of the light (incident on the objective lens 509) in the x-direction is not less than the effective diameter D of the objective lens 509, so that the image spot 513 with a low ellipticity is obtained, and therefore the light will not fall on the adjacent pit rows, as shown in FIG. 32b; however, the efficiency of use of the light (the ratio of the image-forming light to the overall light emitted from the semiconductor laser chip 503) is lowered. Thus, the light diffusion angle ratio θy/θx (called "aspect ratio") of the light emitted from the semiconductor laser chip 503 is about 2 to 3.5, and the diffusion angles in the x-direction and the y-direction is quite different from each other, and therefore the ellipticity of the image spot 513 on the optical disk 510 is high. Therefore, generally, a beam rectification method is adopted in order that the diffusion angle ratio θy/θx can be as close to "1" as possible. In this embodiment, the beam rectification is effected at two stages, that is, at the first and second diffusion angle conversion holograms. If the diffusion angle of the light beam is converted in the x-direction and the y-direction by the first diffusion angle conversion hologram 506 as shown in FIGS. 33a and 33b, the diffusion angle θ'y/θ'x of the light incident on the second diffusion angle conversion hologram 507 is decreased to a certain degree relative to the aspect ratio θy/θx of the light emitted from the semiconductor laser chip 503. However, if only the first diffusion angle conversion hologram 506 is provided, the apparent light-emitting points (as at 595b and 595c in FIGS. 33a and 33b) in the x-direction and the y-direction are different from each other even if the conversion rates of the diffusion angles are properly selected, and as a result astigmatism is produced. Therefore, if the appropriate conversion rates of the diffusion angles are selected by the second diffusion angle hologram 507, the apparent light-emitting points (as at 595d in FIG. 33) in the x-direction and the y-direction are disposed at generally the same position after the conversion. And besides, the second diffusion angle conversion hologram 507 has the function of correcting the phase of the light to be incident on the objective lens 509, so that the light to be incident on the objective lens 509 has an ideal spherical wave 515. Therefore, with respect to the light to be incident on the objective lens 509, the overall half-width Wx in the x-direction and the overall half-width in the y-direction are generally equal to the effective diameter D of the objective lens 509, and the image spot 513 with a low ellipticity will not fall on the adjacent pit rows, so that the C/N ratio will not be degraded. And besides, since the apparent light-emitting points (as at 595d in FIG. 33) of the light (to be incident on the objective lens 509) in the x-direction and the y-direction are disposed at generally the same position, there is provided the ideal spherical wave without astigmatism, and therefore the image spot 513 on the optical disk 510 is condensed by the objective lens 509 substantially into a diffraction limit, and hence has an ideal size, thereby facilitating the recording and reproduction of the information.

Along similar paths as described for the first embodiment, a P polarization component of the return light from the optical disk 510 is guided to the first light-receiving sensor 570 while a S polarization component thereof is guided to the second light-receiving sensor 571, and an opto-magnetic signal is obtained from a differential signal thereof.

Servo signals are detected by guiding the return light from the optical disk 510 to an astigmatism detection element along a similar path as described for the first embodiment. A focus error signal is detected by an astigmatism method, a knife-edge method or a Foucault method as in the first embodiment. A tracking error signal is not detected by a 3-beam method since there is not provided a diffraction grating (as described in the first embodiment) for producing three beams. The tracking error signal can be detected by a push-pull method as in the first embodiment.

In this embodiment, although the light to be incident on the polarized light splitting film 521 is converted into linearly-polarized light of 45° by the V-shaped groove plate 518 formed on the third inclined surface 505c, thereby obtaining the opto-magnetic signal, there may be used, instead of the V-shaped groove plate 518, the half wave plate 318 as in the second embodiment so as to obtain the opto-magnetic signal.

In this embodiment, the first and second diffusion angle conversion holograms and the astigmatism-generating hologram are of the reflective type, reflective-type lenses achieving similar effect can be used instead of these holograms.

In this embodiment, the light, emitted from the semiconductor laser chip 503, is reflected once by the first diffusion angle conversion hologram 506 formed on the second inclined surface 505b, and is reflected once by the second diffusion angle conversion hologram 507 formed on the first inclined surface 505a. Thus, this emitted light is reflected twice in total, and is guided to the first beam splitter film 508; however, the emitted light may be reflected a plurality of times by the first inclined surface 505a and the second inclined surface 505b. In such a case, the first diffusion angle conversion hologram 506 and the second diffusion angle conversion hologram 507 may be formed either of the first and second inclined surfaces 505a and 505b.

As is clear from the foregoing description, in the present invention, the return light from the optical disk to be incident on the analyzer is the linearly-polarized light of about 45°, and the ratio of the P polarization component to the S polarization component is about 50% to 50%, and the two components are applied to the respective light-receiving sensor in the ratio of 50% to 50%, and the noise components of the same phase except for the opto-magnetic signal are removed by the amplification of the differential between the two light-receiving sensors. The light-receiving sensors for detecting the RF signal receive only the RF signal, and therefore the two light-receiving sensors do not need to be of the divided type, and a light amount loss due to a dead zone is eliminated. The beam splitter film having polarization selectivity is used for separating the light from the light-emitting element from the return light from the optical disk, and by increasing the apparent Kerr rotation angle, the RF signal with the high C/N ratio can be obtained. The return light from the optical disk is guided to the focus error detection element which performs the function of the focus detection means without separating the P polarization component from the S polarization component, and the focus error signal is detected Therefore even if the light amount ratio of the P polarized light of the return light from the optical disk to the S polarized light of this return light is varied due to birefringence and the Kerr rotation angle, offset will not develop in the focus error signal. When the tracking error signal is to be detected by the 3-beam method, the spot size on the sensor can be reduced, and the crosstalk between the main beam and the side beams can be suppressed. The light can be converted by the diffusion angle conversion means into the light with a small diffusion angle or generally parallel ray light, and therefore variations in the angle of incidence of the light on the polarization beam splitter, the analyzer and so on are small, and the optical phase can be easily controlled. The light incident on the condensing means has an ideal spherical wave, and therefore the image spot on the optical disk is condensed into the diffraction limit, and hence is formed into the ideal size, so that the recording and reproduction of the information can be effected easily. The diffusion angle conversion means is provided in the two-stage manner, and with this arrangement the aspect ratio of the light incident on the condensing means is made different from the aspect ratio of the light emitted from the light-emitting element. Thus, the ellipticity of the image spot on the optical disk is reduced, thereby suppressing the degrading of the C/N ratio due to leakage of the opto-magnetic signal from the adjacent pit rows.

Since the light can be converted by the diffusion angle conversion means into the light with a small diffusion angle or generally parallel ray light, the high light-utilizing efficiency necessary for erasing the recording can be secured, and the optical phase can be easily controlled while the degrading of the C/N ratio is prevented. Further, the optical system can be of a compact construction. Furthermore, since the light can be converted by the diffusion angle conversion means into the light with a small diffusion angle or generally parallel ray light, variations in the angle of incidence of the light on the polarization beam splitter, the analyzer and so on are small, and the optical phase can be easily controlled. Since the light incident on the condensing means has the ideal spherical wave, the image spot on the optical disk is condensed into the diffraction limit, and hence is formed into the ideal size, so that the recording and reproduction of the information can be effected easily. Since the light incident on the condensing means is the ideal spherical wave, the image spot on the optical disk is condensed into the diffraction limit, and hence is formed into the ideal size, so that the recording and reproduction of the information can be effected easily. The diffusion angle conversion means is provided in the two-stage manner, and with this arrangement the aspect ratio of the light incident on the condensing means is made different from the aspect ratio of the light emitted from the light-emitting element. Thus, the ellipticity of the image spot on the optical disk is reduced, thereby suppressing the degrading of the C/N ratio due to leakage of the opto-magnetic signal from the adjacent pit rows.

A structural member having the optical thin films formed on the plates is formed, and a plurality of the structural members are prepared, and are bonded together to form the assembly structure, with the optical thin films held between the plates. This assembly structure is cut obliquely relative to the bonding surfaces. With this method, the time and labor required for the manufacture of the optical pickup are reduced, and the efficiency of the production is enhanced.

What is claimed is:

1. An optical pickup comprising a light-emitting element; diffusion angle conversion means for converting a diffusion angle of outgoing light relative to a diffusion angle of incident light (hereinafter referred to as "conversion of the diffusion angle"), a beam splitter having polarization selectivity; and condensing means for condensing the light on an information recording surface of an optical disk;

wherein light emitted from said light-emitting element is converted in diffusion angle by said diffusion angle conversion means; and the light, converted in diffusion angle by said diffusion angle conversion means, is reflected by or transmitted through said beam splitter to be guided to said condensing means; and wherein said diffusion angle conversion means is so designed as to satisfy the following formula:

$$0.18 < \sin\theta_1 < 0.30$$

$$0.06 < \sin\theta_2 < 0.17$$

where $\theta_1$ represents the diffusion angle of that portion of the light (emitted from said light-emitting element) which is incident on said diffusion angle conversion means, and $\theta_2$ represents the diffusion angle of the light going out of said diffusion angle conversion means.

2. An optical pickup according to claim 1, in which a hologram is used as said diffusion angle conversion means.

3. An optical pickup according to claim 2, in which said hologram used as said diffusion angle conversion means is of the reflective type.

4. An optical pickup according to claim 1, in which a lens is used as said diffusion angle conversion means.

5. An optical pickup according to claim 4, in which said lens used as said diffusion angle conversion means is of the reflective type.

6. An optical pickup according to claim 1, wherein said diffusion angle conversion means corrects a phase of a spherical wave sent from said beam splitter to said condensing means.

7. An optical pickup according to claim 1, wherein the beam splitter comprises a beam splitter film.

8. An optical pickup according to claim 1, further comprising diffractive beamsplitting means, disposed in an optical path of said light converted in diffusion angle by said diffusion angle conversion means, for splitting said light converted in diffusion angle by said diffusion angle conversion means into zero-order and ±first-order beams and for causing said zero-order and ±first-order beams to be incident on said beam splitter.

9. An optical pickup according to claim 8, wherein said diffractive beamsplitting means comprises a reflective diffraction grating.

10. An optical pickup according to claim 1, wherein the beam splitter has substantially 100% transmittance for a P-polarized component of said light converted in diffusion angle by said diffusion angle conversion means.

11. An optical pickup comprising a light-emitting element; an optical guide member having diffusion angle conversion means and a beam splitter formed integrally thereon; and condensing means for condensing light;

wherein light emitted from said light-emitting element is converted in diffusion angle by said diffusion angle conversion means; and the light, converted in diffusion angle by said diffusion angle conversion means, is reflected by or transmitted through said beam splitter to be guided to said condensing means; and wherein said diffusion angle conversion means is so designed as to satisfy the following formula:

$$0.18 < \sin\theta_1 < 0.30$$

$$0.06 < \sin\theta_2 < 0.17$$

where $\theta_1$ represents the diffusion angle of that portion of the light (emitted from said light-emitting element) which is incident on said diffusion angle conversion means, and $\theta_2$ represents the diffusion angle of the light going out of said diffusion angle conversion means.

12. An optical pickup according to claim 11, in which said diffusion angle conversion means and said beam splitter are inclined relative to the direction of emission of the light from said light-emitting element.

13. An optical pickup according to claim 11 or claim 12, in which the direction of emission of the light from said light-emitting element toward said optical guide member is generally perpendicular to the direction of sending of the light from said optical guide member toward said condensing means.

14. An optical pickup according to claim 12, in which said diffusion angle conversion means and said beam splitter are disposed generally parallel to each other.

15. An optical pickup according to claim 11, wherein said beam splitter comprises a beam splitter film.

16. An optical pickup according to claim 11, wherein the diffusion angle conversion means and the beam splitter are not in contact with an exterior surface of the optical guide member.

17. An optical pickup comprising a light-emitting element; light-receiving elements; an optical guide member having diffusion angle conversion means, polarized light splitting means and a beam splitter formed integrally thereon; and condensing means for condensing light;

wherein light emitted from said light-emitting element is converted in diffusion angle by said diffusion angle conversion means; the light, converted in diffusion angle by said diffusion angle conversion means, is reflected by or transmitted through said beam splitter to be guided to said condensing means, so that the light, condensed by said condensing means, is applied to an optical medium; the light returned from said optical medium is divided by said polarized light splitting means into a P polarization component and S polarization component; and the thus divided light are received by said light-receiving elements; and wherein said diffusion angle conversion means is so designed as to satisfy the following formula;

$$0.18 < \sin\theta_1 < 0.30$$

$$0.06 < \sin\theta_2 < 0.17$$

where $\theta_1$ represents the diffusion angle of that portion of the light (emitted from said light-emitting element) which is incident on said diffusion angle conversion means, and $\theta_2$ represents the diffusion angle of the light going out of said diffusion angle conversion means.

18. An optical pickup according to claim 17, in which said light-receiving elements are provided adjacent to one side surface of said optical guide member, and said condensing means is directed to that side surface of said optical guide member facing away from said one side surface, and said light-emitting element is provided in facing relation to that side surface of said optical guide member disposed perpendicular to said one side surface.

19. An optical pickup according to claim 17, in which said diffusion angle conversion means and said beam splitter are inclined relative to the direction of emission of the light from said light-emitting element.

20. An optical pickup according to claim 17, wherein said beam splitter comprises a beam splitter film.

21. An optical pickup according to claim 17, wherein the diffusion angle conversion means and the beam splitter are not in contact with an exterior surface of the optical guide member.

22. An optical pickup comprising a light-emitting element; first, second and third light-receiving elements; parallel first, second and third inclined surfaces inclined relative to light emitted from said light-emitting element; diffusion angle conversion means formed on one of said first and second inclined surfaces for converting a diffusion angle of that portion of the light (emitted from said light-emitting element) which is incident on said diffusion angle conversion means; a first beam splitter film formed on said second inclined surface and having polarization selectivity for dividing the light from said diffusion angle conversion means into transmitting light and reflecting light; condensing means for condensing the reflected light from said first beam splitter film on an information recording surface of an optical disk; a second beam splitter film formed on said third inclined surface and having polarization selectivity for dividing the light, returned from said optical disk and transmitted through said first beam splitter film, into transmitting light and reflecting light; a grooved plate formed on said third inclined surface facing away from said second inclined surface, said grooved plate having a reflecting surface, formed in its groove, for reflecting the transmitted light from said second beam splitter film; an analyzer formed on said third inclined surface for transmitting a P polarization component of the light, reflected by said grooved plate, therethrough to guide said P polarization component to the first light-receiving element and for reflecting a S polarization component of said reflected light to guide the same to the second light-receiving element; and a focus error detection element formed on one of said second and third inclined surfaces for guiding the reflected light from said second beam splitter film to the third light-receiving element;

wherein said diffusion angle conversion means has the function of correcting the phase of a spherical wave reflected by said first beam splitter film to be incident on said condensing means; and said reflecting surface of said grooved plate has the function of converting a polarized condition of the incident light on said analyzer into linearly-polarized light of about 45°.

23. An optical pickup according to claim 22, in which a diffraction grating of the reflective type is formed on one of said first and second inclined surfaces for dividing the light from said diffusion angle conversion means into three beams, that is, zero-order diffraction light and ±first order diffraction light and for guiding said three beams to said first beam splitter film.

24. An optical pickup comprising a light-emitting element; first, second and third light-receiving elements; parallel first, second and third inclined surfaces inclined relative to light emitted from said light-emitting element; diffusion angle conversion means formed on said second inclined surface for converting a diffusion angle of that portion of the light (emitted from said light-emitting element) which is incident on said diffusion angle conversion means; a reflective-type diffraction grating formed on said first inclined surface for dividing light into three beams, that is, zero-order diffraction light and ±first order diffraction light; a first beam splitter film formed on said second inclined surface and having polarization selectivity for dividing said three beams, produced by said reflective-type diffraction grating, into transmitting light and reflecting light; condensing means for condensing the reflected light from said first beam splitter film on an information recording surface of an optical disk; a second beam splitter film formed on said third inclined surface and having polarization selectivity for dividing the light, returned from said optical disk and transmitted through said first beam splitter film, into transmitting light and reflecting light; a grooved plate formed on said third inclined surface facing away from said second inclined surface, said grooved plate having a reflecting surface, formed in its groove, for reflecting the transmitted light from said second beam splitter film; an analyzer formed on said third inclined surface for transmitting a P polarization component of the light, reflected by said grooved plate, therethrough and for reflecting a S polarization component of said reflected light to guide the same to the first light-receiving element; a first reflecting film formed on said second inclined surface for reflecting the P polarization component, transmitted through said analyzer, to guide the same to the second light-receiving element; a focus error detection element formed on said second inclined surface for reflecting the reflected light from said second beam splitter film; a second reflecting film formed on said third inclined surface for reflecting the reflected light from said focus error detection element; and a third reflecting film formed on said second inclined surface for reflecting the reflected light from said second reflecting film to guide the same to the third light-receiving element;

wherein said diffusion angle conversion means has the function of correcting the phase of a spherical wave reflected by said first beam splitter film to be incident on said condensing means; and said reflecting surface of said grooved plate has the function of converting a polarized condition of the incident light on said analyzer into linearly-polarized light of about 45°.

25. An optical pickup comprising a light-emitting element; first, second and third light-receiving elements; parallel first, second and third inclined surfaces inclined relative to light emitted from said light-emitting element; diffusion angle conversion means formed on said second inclined surface for converting a diffusion angle of that portion of the light (emitted from said light-emitting element) which is incident on said diffusion angle conversion means; a fourth reflecting film formed on said first inclined surface for reflecting the reflected light from said diffusion angle conversion means; a first beam splitter film formed on said second inclined surface and having polarization selectivity for dividing the reflected light from said fourth reflecting film into transmitting light and reflecting light; condensing means for condensing the reflected light from said first beam splitter film on an information recording surface of an optical disk; a second beam splitter film formed on said third inclined surface and having polarization selectivity for dividing the light, returned from said optical disk and transmitted through said first beam splitter film, into transmitting light and reflecting light; a grooved plate formed on said third inclined surface facing away from said second inclined surface, said grooved plate having a reflecting surface, formed in its groove, for reflecting the transmitted light from said second beam splitter film; an analyzer formed on said third inclined surface for transmitting a P polarization component of the light, reflected by said grooved plate, therethrough and for reflecting a S polarization component of said reflected light to guide the same to the first light-receiving element; a first reflecting film formed on said second inclined surface for reflecting the P polarization component, transmitted through said analyzer, to guide the same to the second light-receiving element; a focus error detection element formed on said second inclined surface for reflecting the reflected light from said second beam splitter film; a second reflecting film formed on said third inclined surface for reflecting the reflected light from said focus error detection element; and a third reflecting film formed on said second inclined surface for reflecting the reflected light from said second reflecting film to guide the same to the third light-receiving element;

wherein said diffusion angle conversion means has the function of correcting the phase of a spherical wave reflected by said first beam splitter film to be incident on said condensing means; and said reflecting surface of said grooved plate has the function of converting a polarized condition of the incident light on said analyzer into linearly-polarized light of about 45°.

26. An optical pickup according to any one of claims 22, 24 amd 25, in which said diffusion angle conversion means is so designed as to satisfy the following formula;

$$0.18 < \sin\theta_1 < 0.30$$

$$0.06 < \sin\theta_2 < 0.17$$

where $\theta_1$ represents the diffusion angle of that portion of the light (emitted from said light-emitting element) which is incident on said diffusion angle conversion means, and $\theta_2$ represents the diffusion angle of the light going out of said diffusion angle conversion means.

27. An optical pickup according to any one of claims 22, 24 and 25, in which the light emitted from said light-emitting element is converted by said diffusion angle conversion means into generally parallel ray light, and there is provided a lens for converting the reflected light from said first beam splitter film from generally parallel ray light into diffused light.

28. An optical pickup according to any one of claims 22, 24 and 25, in which a hologram is used as said diffusion angle conversion means.

29. An optical pickup according to claim 28, in which said hologram used as said diffusion angle conversion means is of the reflective type.

30. An optical pickup according to any one of claims 22, 24 and 25, in which a lens is used as said diffusion angle conversion means.

31. An optical pickup according to claim 30, in which said lens used as said diffusion angle conversion means is of the reflective type.

32. An optical pickup according to any one of claims 22, 24 and 25, in which a polarized light splitting film is used as said analyzer.

33. An optical pickup according to any one of claims 22, 24 and 25, in which a hologram is used as said focus error detection element, and a focus error signal is detected using one of an astigmatism method, a Foucault method and a knife-edge method.

34. An optical pickup according to claim 33, in which said hologram, used as said focus error detection means, is of the reflective type.

35. An optical pickup according to any one of claims 22, 24 and 25, in which a lens is used as said focus error detection element, and a focus error signal is detected using one of an astigmatism method, a Foucault method and a knife-edge method.

36. An optical pickup according to claim 35, in which said lens, used as said focus error detection element, is of the reflective type.

* * * * *